United States Patent
Chen-Ho et al.

(10) Patent No.: US 12,032,059 B2
(45) Date of Patent: Jul. 9, 2024

(54) RADAR-OPTICAL FUSION ARTICLE AND SYSTEM

(71) Applicant: 3M INNOVATIVE PROPERTIES COMPANY, St. Paul, MN (US)

(72) Inventors: Kui Chen-Ho, Woodbury, MN (US); Jonathan D. Gandrud, Woodbury, MN (US); Mohsen Salehi, Woodbury, MN (US); Douglas S. Dunn, Woodbury, MN (US); Jaewon Kim, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 367 days.

(21) Appl. No.: 17/612,329

(22) PCT Filed: May 22, 2020

(86) PCT No.: PCT/IB2020/054894
§ 371 (c)(1),
(2) Date: Nov. 18, 2021

(87) PCT Pub. No.: WO2020/240382
PCT Pub. Date: Dec. 3, 2020

(65) Prior Publication Data
US 2022/0299630 A1  Sep. 22, 2022

Related U.S. Application Data

(60) Provisional application No. 62/852,524, filed on May 24, 2019.

(51) Int. Cl.
*G01S 13/931* (2020.01)
*B62J 45/20* (2020.01)
(Continued)

(52) U.S. Cl.
CPC ............ *G01S 13/931* (2013.01); *G02B 5/124* (2013.01); *G06K 19/07758* (2013.01);
(Continued)

(58) Field of Classification Search
None
See application file for complete search history.

(56) References Cited

U.S. PATENT DOCUMENTS

| | | | |
|---|---|---|---|
| 2,908,002 A | 10/1959 | Atta | |
| 4,001,822 A * | 1/1977 | Sterzer | H01Q 1/32 342/51 |

(Continued)

FOREIGN PATENT DOCUMENTS

| | | |
|---|---|---|
| CN | 202429185 | 9/2012 |
| DE | 102016215102 | 12/2017 |

(Continued)

OTHER PUBLICATIONS

Chung, "A Retrodirective Microstrip Antenna Array", IEEE Transactions on Antennas and Propagation, 1998, vol. 46, No. 12, pp. 1802-1809.
(Continued)

*Primary Examiner* — Peter M Bythrow

(57) ABSTRACT

A radar-optical fusion article for attachment to a substrate is described. The radar-optical fusion article includes a first retroreflective layer which is configured to retroreflect at least a portion of light having a wavelength in a range from about 400 nm to about 2500 nm. The radar-optical fusion article includes a second retroreflective layer disposed adjacent to the first retroreflective layer. The second retroreflective layer is configured to retroreflect at least a portion of an electromagnetic wave having a frequency in the range from about 0.5 GHz to about 100 GHz.

21 Claims, 12 Drawing Sheets

(51) Int. Cl.
- *B62J 45/41* (2020.01)
- *B62K 3/00* (2006.01)
- *G02B 5/124* (2006.01)
- *G06K 19/077* (2006.01)

(52) U.S. Cl.
CPC .............. *B62J 45/20* (2020.02); *B62J 45/41* (2020.02); *B62K 3/002* (2013.01); *B62K 2202/00* (2013.01)

(56) References Cited

U.S. PATENT DOCUMENTS

| | | | | |
|---|---|---|---|---|
| 4,222,662 | A * | 9/1980 | Kruegle | G07C 9/22 283/88 |
| 5,477,219 | A * | 12/1995 | Zarembo | G08B 13/248 340/572.6 |
| 5,608,391 | A * | 3/1997 | Bantli | B60R 13/10 342/51 |
| 5,657,008 | A * | 8/1997 | Bantli | G08G 1/017 342/51 |
| 5,706,132 | A * | 1/1998 | Nestegard | G02B 5/124 359/530 |
| 5,856,048 | A * | 1/1999 | Tahara | G06K 19/06046 283/88 |
| 5,945,938 | A * | 8/1999 | Chia | H01Q 21/065 342/51 |
| 5,988,820 | A * | 11/1999 | Huang | G02B 5/124 359/530 |
| 6,004,422 | A * | 12/1999 | Janovec | G02B 5/124 359/530 |
| 6,019,287 | A * | 2/2000 | Mann | G06K 19/14 235/488 |
| 6,024,455 | A * | 2/2000 | O'Neill | G02B 5/124 359/530 |
| 6,677,028 | B1 * | 1/2004 | Lasch | G02B 5/124 428/209 |
| 6,758,405 | B2 * | 7/2004 | Look | G06K 19/18 235/494 |
| 6,894,615 | B2 * | 5/2005 | Look | G06K 19/16 343/866 |
| 7,034,688 | B2 * | 4/2006 | Rietzler | G06K 19/07779 340/5.86 |
| 7,081,819 | B2 * | 7/2006 | Martinez de Velasco Cortina | G06K 7/0008 340/505 |
| 7,224,279 | B2 * | 5/2007 | Mimura | G07B 15/063 340/693.5 |
| 7,387,393 | B2 * | 6/2008 | Reich | G06K 19/06046 359/350 |
| 7,463,154 | B2 * | 12/2008 | Cortina | G06K 19/07745 257/679 |
| 7,862,187 | B2 * | 1/2011 | Thakkar | G02B 5/124 359/530 |
| 7,874,490 | B2 * | 1/2011 | Thomas, III | G06K 19/0723 235/491 |
| 8,052,171 | B2 * | 11/2011 | Staub | B42D 25/342 340/572.1 |
| 8,113,434 | B2 * | 2/2012 | Thomas, III | G06K 19/06009 359/530 |
| 8,167,212 | B2 * | 5/2012 | Kofman | G01S 13/9076 235/492 |
| 8,506,095 | B2 * | 8/2013 | Bacon, Jr. | G02B 5/124 359/529 |
| 8,668,341 | B2 * | 3/2014 | Caswell | G02B 21/367 359/530 |
| 8,865,293 | B2 | 10/2014 | Smithson | |
| 9,366,789 | B2 * | 6/2016 | Thakkar | G02B 1/04 |
| 9,655,390 | B2 | 5/2017 | Davis | |
| 9,864,120 | B2 * | 1/2018 | Free | G02B 5/0841 |
| 10,145,993 | B1 * | 12/2018 | Hadi | H04B 10/1121 |
| 10,281,623 | B2 * | 5/2019 | McCoy | A41D 27/085 |
| 10,460,635 | B1 * | 10/2019 | Cameron | G09F 17/00 |
| 10,723,299 | B2 * | 7/2020 | Kinsler | B60R 21/01332 |
| 11,161,412 | B2 | 11/2021 | Hou | |
| 11,181,632 | B2 * | 11/2021 | Shtrom | G01S 13/758 |
| 2008/0000976 | A1 * | 1/2008 | Thomas | G06K 7/10 235/487 |
| 2011/0080637 | A1 * | 4/2011 | Mullen | G02B 5/128 359/359 |
| 2011/0228391 | A1 * | 9/2011 | Bacon, Jr | G02B 5/128 359/529 |
| 2011/0228393 | A1 * | 9/2011 | Caswell | G02B 21/367 359/530 |
| 2012/0099199 | A1 * | 4/2012 | Vasylyev | B29D 11/00605 359/530 |
| 2013/0114143 | A1 * | 5/2013 | Thakkar | G02B 1/04 359/530 |
| 2015/0145711 | A1 | 5/2015 | Maddox | |
| 2015/0160384 | A1 * | 6/2015 | Arbabi | H04B 10/516 359/542 |
| 2016/0132705 | A1 * | 5/2016 | Kovarik | G06K 7/10376 340/10.3 |
| 2016/0238705 | A1 | 8/2016 | Mukai | |
| 2016/0356674 | A1 * | 12/2016 | Chien | H01Q 15/14 |
| 2016/0359235 | A1 * | 12/2016 | Driscoll | H01Q 15/148 |
| 2017/0372607 | A1 * | 12/2017 | Janovec | G08G 1/096725 |
| 2018/0059231 | A1 | 3/2018 | Dewberry | |
| 2018/0081094 | A1 * | 3/2018 | Aikin | G05D 1/028 |
| 2019/0092360 | A1 | 3/2019 | Green | |
| 2019/0187456 | A1 * | 6/2019 | Filo | G09F 3/02 |
| 2019/0250269 | A1 * | 8/2019 | Miu | G05D 1/021 |
| 2020/0292735 | A1 * | 9/2020 | Hadi | G08G 1/09 |
| 2020/0310467 | A1 * | 10/2020 | Birkedahl | G05D 1/0676 |

FOREIGN PATENT DOCUMENTS

| | | |
|---|---|---|
| EP | 0479273 | 4/1992 |
| WO | WO 2015-013240 | 1/2015 |
| WO | WO 2017-217929 | 12/2017 |
| WO | WO 2018-100513 | 6/2018 |
| WO | WO 2018-151761 | 8/2018 |
| WO | WO 2018-178802 | 10/2018 |
| WO | WO 2018-178803 | 10/2018 |
| WO | WO 2018-178844 | 10/2018 |
| WO | WO 2018-215833 | 11/2018 |
| WO | WO 2019-082130 | 5/2019 |
| WO | WO 2019-082162 | 5/2019 |
| WO | WO 2019-084295 | 5/2019 |
| WO | WO 2019-084297 | 5/2019 |
| WO | WO 2019-145909 | 8/2019 |
| WO | WO 2019-145911 | 8/2019 |
| WO | WO 2019-148000 | 8/2019 |
| WO | WO 2020-021419 | 1/2020 |
| WO | WO 2020-021459 | 1/2020 |
| WO | WO 2020-217220 | 10/2020 |
| WO | WO 2020-217221 | 10/2020 |
| WO | WO 2020-240364 | 12/2020 |

OTHER PUBLICATIONS

Hallbjorner, "Improvement in 77-GHz Radar Cross Section of Road Work Jacket and Side Screen by Use of Planar Flexible Retrodirective Reflectors", IEEE Antennas and Wireless Propagation Letters, 2013, vol. 12, pp. 1085-1088.

Hester, "Inkjet-Printed Flexible mm-Wave Van-Atta Reflectarrays: A Solution for Ultralong-Range Dense Multitag and Multisensing Chipless RFID Implementations for IoT Smart Skins", IEEE Transactions on Microwave Theory and Techniques, 2016, vol. 64, No. 12, pp. 4763-4773.

International Search Report for PCT International Application No. PCT/IB2020/054894, mailed on Oct. 9, 2020, 6 pages.

* cited by examiner

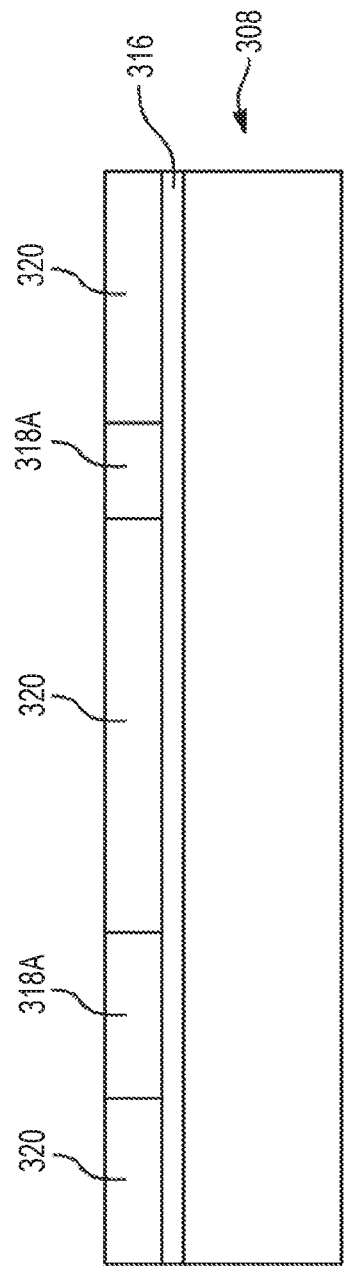
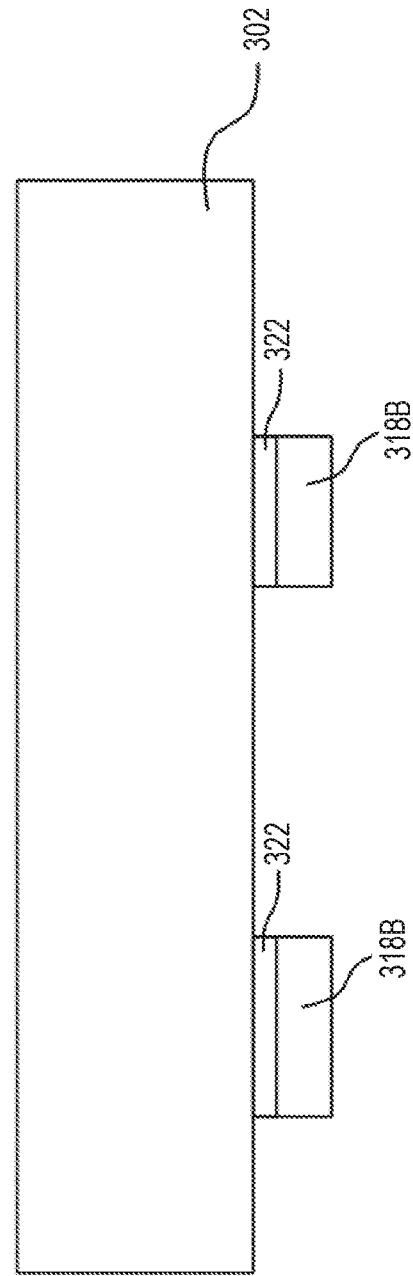
FIG. 3B
FIG. 3C

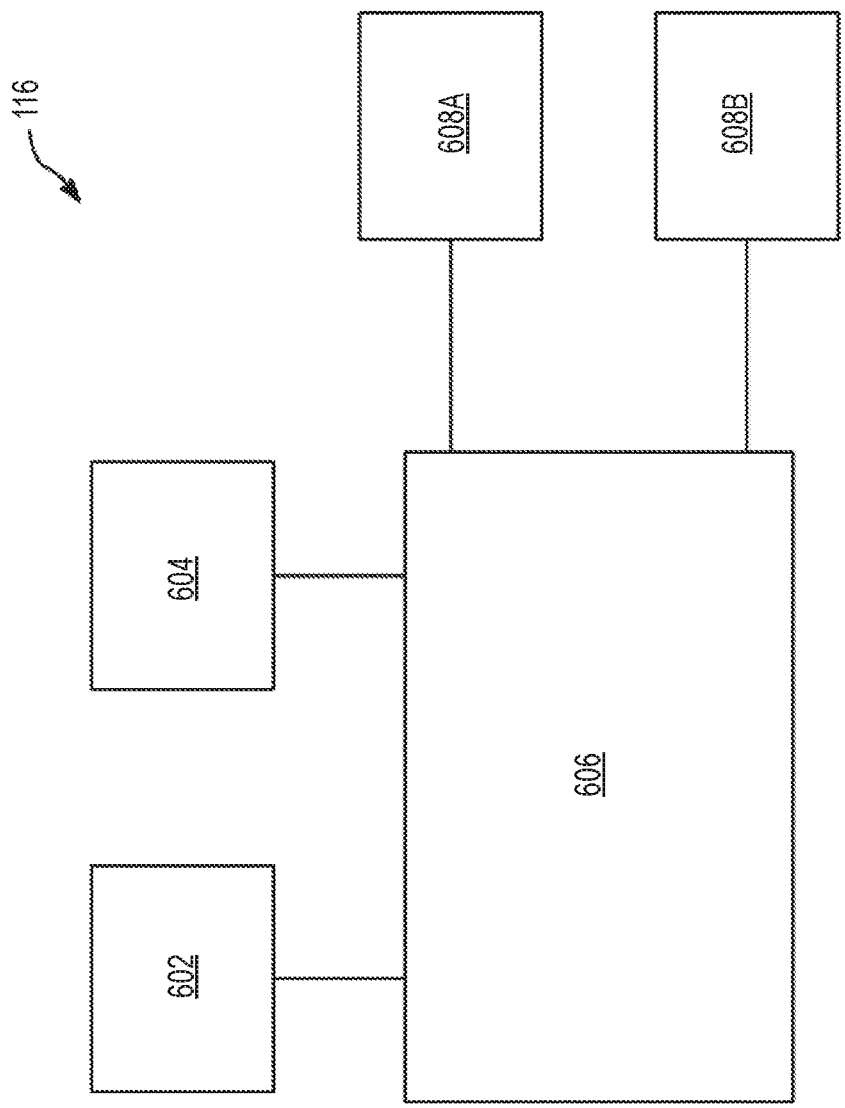

RADAR-OPTICAL FUSION ARTICLE AND SYSTEM

CROSS REFERENCE TO RELATED APPLICATIONS

This application is a national stage filing under 35 U.S.C. 371 of PCT/IB2020/054894, filed May 22, 2020, which claims the benefit of US Provisional Application No. 62/852524, filed May 24, 2019, the disclosure of which is incorporated by reference in its/their entirety herein.

TECHNICAL FIELD

The present disclosure relates generally to articles used for identification.

BACKGROUND

Driving assistance systems and autonomous driving assistance systems typically use various sensors to detect objects around a vehicle. For example, an image sensor is used to identify objects in the field of view of the image sensor by generating a spatial image. Some driving assistance systems use radar sensors to provide information about speed and distance of the objects. However, these driving assistance systems are not able to differentiate between objects in various scenarios. For example, in case of a micro-mobility device, such as an electrically powered scooter, operated by a driver, the driving assistance system of a vehicle may not detect the micro-mobility device as it has a smaller profile compared to the driver. In other scenarios, the driving assistance system may classify the micro-mobility device and the driver as a same entity (due to similar radar cross section) resulting in an erroneous detection. The driving assistance system may also be unable to distinguish between a pedestrian and the micro-mobility device.

SUMMARY

Generally, the present disclosure relates to a radar-optical fusion article for identification of a substrate to which the radar-optical fusion article is attached. In one aspect, a radar-optical fusion article for attachment to a substrate is described. The radar-optical fusion article includes a first retroreflective layer which is configured to retroreflect at least a portion of light having a wavelength in a range from about 400 nanometer (nm) to about 2500 nm. The radar-optical fusion article includes a second retroreflective layer disposed adjacent to the first retroreflective layer. The second retroreflective layer is configured to retroreflect at least a portion of an electromagnetic wave having a frequency in the range from about 0.5 gigahertz (GHz) to about 100 GHz.

In another aspect, a micro-mobility device is described. The micro-mobility device includes a chassis having a rear wheel mount at one end and a front wheel mount at the other end with a chassis support member extending therebetween. The micro-mobility device includes a chassis-supported rear wheel mounted to the rear wheel mount. The micro-mobility device includes a chassis-supported front wheel mounted to the front wheel mount for turning steering movement with respect to the front wheel mount and the chassis-supported rear wheel. The micro-mobility device further includes a chassis-supported motor physically coupled to the chassis and configured by a motor controller to drive at least one of the chassis-supported front wheel or the chassis-supported rear-wheel for powered movement over a ground surface. The micro-mobility device includes the radar-optical fusion article attached to at least a portion of the micro-mobility device. The radar-optical fusion article includes a first retroreflective layer configured to retroreflect at least a portion of light having a wavelength in a range from about 400 nm to about 2500 nm. The radar-optical fusion article includes a second retroreflective layer disposed adjacent to the first retroreflective layer. The second retroreflective layer is configured to retroreflect at least a portion of an electromagnetic wave having a frequency in the range from about 0.5 GHz to about 100 GHz.

In a further aspect, a system is described. The system includes a first transceiver configured to receive at least a portion of light having a wavelength in a range from about 400 nm to about 2500 nm. The light is retroreflected from a first retroreflective layer of a radar-optical fusion article configured for attachment to a substrate. The system includes a second transceiver configured to receive at least a portion of an electromagnetic wave having a frequency in a range from about 0.5 GHz to about 100 GHz. The electromagnetic wave is retroreflected from a second retroreflective layer disposed adjacent to the first retroreflective layer. The system includes a controller communicatively coupled to the first transceiver and the second transceiver. The controller is configured to process the retroreflected electromagnetic wave received by the second transceiver to determine a location of the substrate. The controller is configured to control the first transceiver to receive the retroreflected light from the first retroreflective layer based on the location of the substrate. The controller is configured to process the retroreflected light received by the first transceiver to generate an output signal identifying the substrate.

In a further aspect, an article configured for attachment to a substrate is described. The article includes a first retroreflective layer configured to retroreflect at least a portion of light having a wavelength in a range from about 400 nm to about 2500 nm to a first transceiver. The article includes a second retroreflective layer disposed adjacent to the first retroreflective layer. The second retroreflective layer is configured to retroreflect at least a portion of an electromagnetic wave having a frequency in a range from about 0.5 GHz to 100 GHz to a second transceiver. The retroreflected electromagnetic wave is processed to determine a location of the substrate. The first transceiver is controlled to receive the retroreflected light from the first retroreflective layer based on the location of the substrate.

In a further aspect, a computing device is described. The computing device includes one or more computer processors, and a memory including instructions that are executed by the one or more computer processors. The memory includes instructions that when executed by the one or more computer processors, cause the one or more computer processors to process at least a portion of light having a wavelength in a range from about 400 nm to about 2500 nm, wherein the light is retroreflected from a first retroreflective layer of a radar-optical fusion article configured for attachment to a substrate. The memory includes instructions that when executed by the one or more computer processors, cause the one or more computer processors to process at least a portion of an electromagnetic wave having a frequency in the range from about 0.5 GHz to about 100 GHz, wherein the electromagnetic wave is retroreflected from a second retroreflective layer disposed adjacent to the first retroreflective layer. The memory includes instructions that when executed by the one or more computer processors, cause the one or more computer processors to determine a location of the substrate based on the processing of the retroreflected electromagnetic wave. The memory includes instructions that when executed by the one or more computer processors, cause the one or more computer processors to control a first transceiver to receive the retroreflected light from the first retroreflective layer based on the location of the substrate, wherein the retroreflected electromagnetic wave from the second retroreflective layer is received by a second transceiver.

BRIEF DESCRIPTION OF DRAWINGS

The disclosure may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIGS. 3B and 3C are schematic diagrams illustrating examples of the second retroreflective layer of radar-optical fusion article, in accordance with techniques of this disclosure.

FIG. 6 is a block diagram of a system for identifying the radar-optical fusion article, in accordance with techniques of this disclosure.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

"Retroreflect" as that term is used herein, may include reflecting a signal back in the direction from which it came using a retroreflector (e.g., a corner cube or a Van Atta array).

Figure 1:
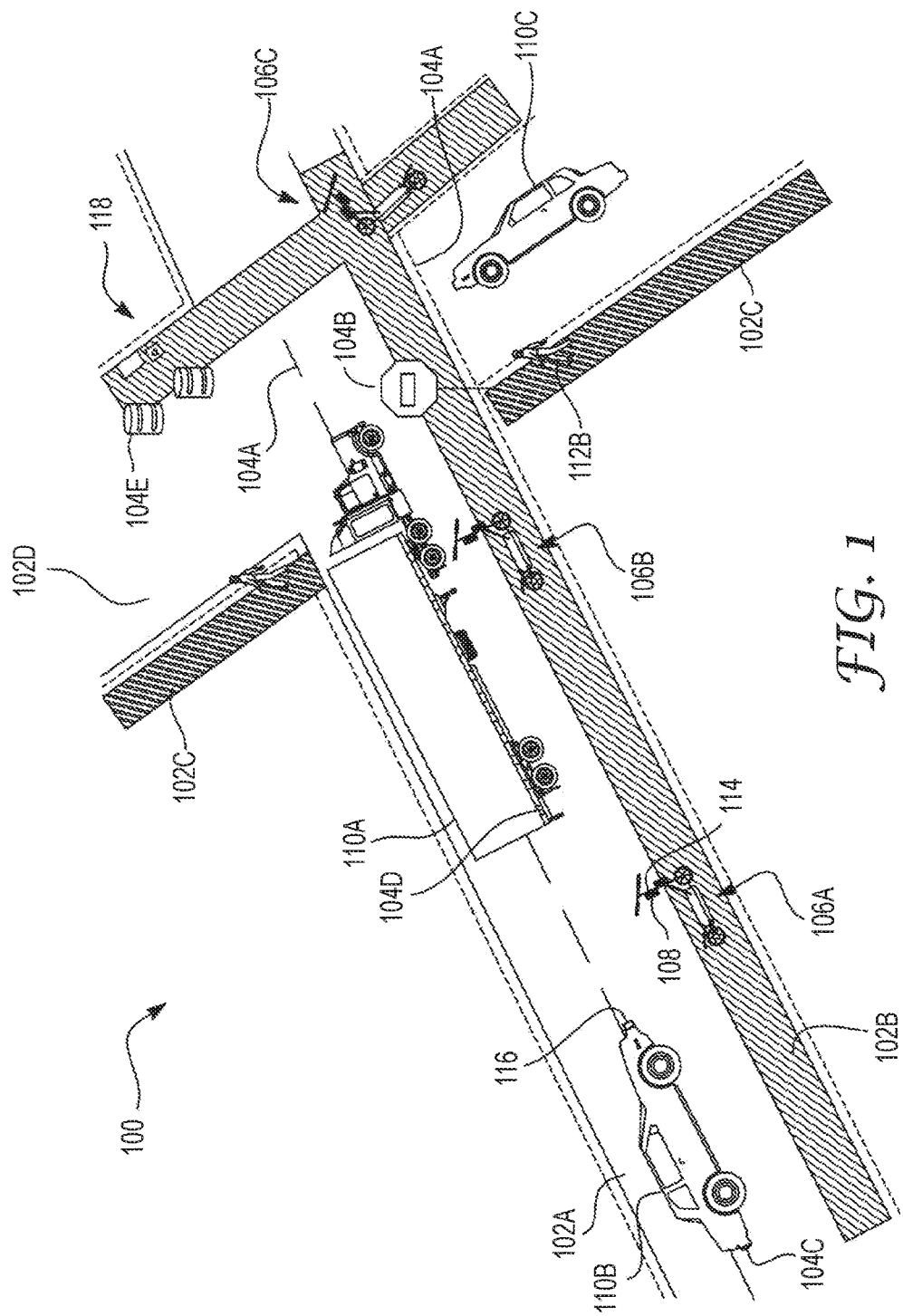
FIG. 1 is a conceptual diagram illustrating an example physical environment having a transportation system that includes one or more micro-mobility devices, in accordance with techniques of this disclosure.

FIG. 1 is a conceptual diagram illustrating an example physical environment having transportation system 100 that includes one or more micro-mobility devices, in accordance with techniques of this disclosure. In the example of FIG. 1, transportation system 100 includes a variety of different infrastructure elements (generally referred to as "infrastructure"). As shown in the example of FIG. 1, infrastructure may include dedicated transportation pathways 102A-102D (collectively, transportation pathways 102) as well as infrastructure articles 104A-104E (collectively, infrastructure articles 104) positioned and oriented within the environment.

As shown in FIG. 1, transportation system 100 includes one or more micro-mobility devices 106A-106C (collectively, micro-mobility devices 106). Examples of micro-mobility devices 106 include electrically powered food delivery devices, electrically powered hoverboards or skateboards, electrically powered scooters, or other small-profile devices that may use or travel upon a roadway or sidewalk. Micro-mobility devices 106 may operate on transportation pathways 102. As described in more detail with reference to FIG. 2, in this example, micro-mobility device 106 includes a chassis, a front wheel, a rear wheel, an electric motor, a steering assembly, and a radar-optical fusion article 108 (also referred to as, article 108). In this example, the chassis includes a rear-wheel mount at one end of the chassis, a front-wheel mount at another end of the chassis that is opposite the rear-wheel mount, and a chassis support extending horizontally between the rear-wheel mount and the front-wheel mount. The front and rear wheels are mounted to the front and rear wheel mounts of the chassis, respectively. The front wheel mount is coupled to a steering assembly. In some examples, the steering assembly includes handlebars such that turning the handle bars causes the front wheel to turn. In some examples, the electric motor is physically coupled to the chassis and is configured by a motor controller to drive at least one of the chassis-supported front wheel or chassis-supported rear wheel for powered movement over a ground surface.

Examples of transportation pathways 102 include a vehicle pathway (e.g., pathway 102A, 102D), a bicycle pathway (e.g., pathway 102B), or a pedestrian pathway (e.g., pathway 102C), among others. In other examples, transportation pathways 102 may be sidewalks, public spaces, or other surfaces not specifically dedicated to certain types of vehicles or traffic. Vehicle pathways (e.g., 102A, 102D) may be used by vehicles 110A-110C (collectively, vehicles 110) to transport people or goods. Examples of vehicles 110 include automobiles (e.g., 110B, 110C) such as cars, trucks, passenger vans; buses; motorcycles; recreational vehicles (RVs); or lorries (e.g., 110A), etc. Examples of vehicle pathways can also include alleys, streets, and highways (or a vehicle specific portion thereof, such as a vehicle driving lane), among others. Bicycle pathways (e.g., 102B) may be used by bicycles or vehicles and bicycles. Examples of bicycle pathways include a street or a portion of a street designated for bicycles, a bicycle trail, among others. In some instances, a pedestrian pathway (e.g., 102C) is primarily used by pedestrians 112. Examples of pedestrian pathways include a pedestrian sidewalk or a jogging path. In some examples, one of transportation pathways 102 may include two or more different types of pathways. For instance, transportation pathway 102A may include a vehicle driving lane of a vehicle pathway and a bicycle pathway adjacent to the driving lane. Transportation pathways 102 may include portions not limited to the respective pathways themselves. In the example of transportation pathway 102A (e.g., a vehicle pathway), transportation pathway 102A may include the road shoulder, physical structures near the pathway such as toll booths, railroad crossing equipment, traffic lights, guardrails, and generally encompassing any other properties or characteristics of the pathway or objects/structures in proximity to the pathway.

Examples of infrastructure articles 104 include a pavement marking (e.g., infrastructure article 104A), a roadway sign (e.g., infrastructure article 104B), a license plate (e.g., infrastructure article 104C), a conspicuity tape (e.g., infrastructure article 104D), and a hazard marker (e.g., infrastructure article 104E, such as a construction barrel, a traffic cone, a traffic barricade, a safety barrier, among others). Pavement markings may include liquid markings, tape, or raised pavement markings to name only a few examples. In some examples, pavement markings may include sensors, materials, or structures that permit the detection of the marking and/or communication of information between the pavement marking and a receiving device. Additional examples of infrastructure articles 104 include traffic lights, guardrails, billboards, electronic traffic signs (also referred to as a variable-message sign), among others. Infrastructure articles 104 may include information that may be detected by one or more sensors disposed in the transportation system 100.

In some examples, an infrastructure article, such as infrastructure article 104B, may include an article message on the physical surface of infrastructure article 104B. The article message may include characters, images, and/or any other information that may be printed, formed, or otherwise embodied on infrastructure article 104B. For example, each infrastructure article 104B may have a physical surface having the article message embodied thereon. The article message may include human-perceptible information and machine-perceptible information.

Human-perceptible information may include information that indicates one or more first characteristics of a pathway, such as information typically intended to be interpreted by human drivers. In other words, the human-perceptible information may provide a human-perceptible representation that is descriptive of at least a portion of transportation pathway 102. As described herein, human-perceptible information may generally refer to information that indicates a general characteristic of a transportation pathway and that is intended to be interpreted by a human driver. For example, the human-perceptible information may include words (e.g., "STOP" or the like), symbols, graphics (e.g., an arrow indicating the road ahead includes a sharp turn) or shapes (e.g., signs or lane markings). Human-perceptible information may include the color of the article, the article message or other features of the infrastructure article, such as the border or background color. For example, some background colors may indicate information only, such as "scenic overlook" while other colors may indicate a potential hazard (e.g., the red octagon of a stop sign, or the double yellow line of a no passing zone).

In some instances, the human-perceptible information may correspond to words or graphics included in a specification. For example, in the United States (U.S.), the human-perceptible information may correspond to words or symbols included in the Manual on Uniform Traffic Control Devices (MUTCD), which is published by the U.S. Department of Transportation (DOT) and includes specifications for many conventional signs for roadways. Other countries have similar specifications for traffic control symbols and devices.

Machine-perceptible information may generally refer to information configured to be interpreted by a monitoring system (as described in more detail with reference to FIG. 6) such as those installed on micro-mobility device 106 and/or vehicles 110. For example, the article message may be encoded via a 2-dimensional bar code, such as a QR code. In some examples, machine-perceptible information may be interpreted by a human driver. In other words, machine-perceptible information may include a feature of the graphical symbol that is a computer-interpretable visual property of the graphical symbol. In some examples, the machine-perceptible information may relate to the human-perceptible information, e.g., provide additional context for the human-perceptible information. In an example of an arrow indicating a sharp turn, the human-perceptible information may be a general representation of an arrow, while the machine-perceptible information may provide an indication of the shape of the turn including the turn radius, any incline of the roadway, a distance from the sign to the turn, or the like. The additional information may be visible to human operator(s) of micro-mobility device 106 and/or vehicle 110; however, the additional information may not be readily interpretable by the human operators, particularly at speed. In other examples, the additional information may not be visible to a human operator but may still be machine readable by a monitoring system of micro-mobility device 106 and/or vehicle 110. In some examples, infrastructure article 104 may be an optically active article which is readily detectible by vision systems having an infrared camera or other camera configured for detecting electromagnetic radiation. The electromagnetic radiation may have wavelength encompassing one or more bands of the electromagnetic spectrum, which may include the visible band (such as the light in a wavelength range from about 400 nm to about 700 nm), the infrared band (such as the light in a wavelength range from about 700 nm to about 2500 nm), the ultraviolet band, and so forth. For example, infrastructure articles 104 may be reflective, such as retroreflective, within one or more bands of the electromagnetic spectrum that are readily detectible by visions systems of micro-mobility devices 106 and/or vehicles 110. In other examples, infrastructure article 104 may be a radar active article which is readily detectible by radar systems. The electromagnetic radiation may have wavelength encompassing one or more bands of the electromagnetic spectrum typical for radar frequency, such as a frequency range from about 75 GHz to about 81 GHz.

The article message may indicate a variety of types of information. In some examples, the article message may, for instance, provide micro-mobility device 106 with static information related to a region of transportation pathway 102. Static information may include any information that is related to navigation of transportation pathway 102 associated with the article message, and not subject to change. For example, certain features of transportation pathways 102 may be standardized and/or commonly used, such that the article message may correspond to a pre-defined classification or operating characteristic of the respective pathway. As some examples, the article message may indicate a navigational characteristic or feature of the pathway, an operating rule or set of operating rules of the pathway, or the like.

Infrastructure articles 104 may include a variety of indicators and/or markers. For example, infrastructure article 104 may include one or more of an optical tag, a radio-frequency identification tag, a radio-frequency tag, a radar tag, a magnetic tag, an acoustic surface pattern, or a material configured to provide a specific signature to an electromagnetic signal incident on the material. In some examples, infrastructure articles 104 may transmit or receive data to/from micro-mobility devices 106 or vehicles 110 via near-field communication (NFC) protocols and signals, laser, radar, or infrared-based readers, or other communication type.

Referring to FIG. 1, radar-optical fusion article 108 (or article 108) is attached to a substrate 114. In this example, substrate 114 is a portion of micro-mobility device 106. However, in some instances, article 108 may be attached to other substrates 114. Substrate 114 may be a physical surface of vehicle 100, infrastructure article 104, micro-mobility device 106, a building, a human, a clothing article (for example, construction vest), or a wearable article (for example, helmet), or any article that needs to be identified, such as a wheelchair, a baby stroller, a mail box, a light post, a machine, or a package.

Article 108 is configured to retroreflect at least a portion of light incident on article 108. The light has a wavelength in a range from about 400 nm to about 2500 nm. Further, article 108 is configured to retroreflect at least a portion of an electromagnetic wave incident on article 108. The electromagnetic wave has a frequency in a range from about 0.5 GHz to about 100 GHz. The electromagnetic wave is received and processed by a monitoring system 116. As shown in FIG. 1, monitoring system 116 is provided in vehicle 110B to monitor the surrounding environment of vehicle 110B. Monitoring system 116 includes one or more sensors that perceive characteristics of the environment, infrastructure, and other objects around vehicle 110B. Some examples of sensors may include image sensor, radar, sonar, LiDAR, among others. These sensors generate sensor data indicative of sensed characteristics. An object may be proximate to a vehicle 110B when the object is detectable by one or more sensors of monitoring system 116. In some instances, monitoring system 116 may be provided on other vehicles 110A, 110C, micro-mobility devices 106, infrastructure articles 104, or a building. Further, one or more monitoring systems 116 may be configured to communicate with each other and share information about detected objects.

Monitoring system 116 is configured to process the retroreflected electromagnetic wave to determine a property of substrate 114 with which article 108 is attached. For example, monitoring system 116 may process a retroreflected radar signal to determine the location of substrate 114. Further, monitoring system 116 may use the location of substrate 114 to gather more information about substrate 114 and/or article 108. In one instance, upon determining the location, monitoring system 116 is configured to receive the retroreflected light from article 108. In one example, the retroreflected light has a wavelength in a range from about 700 nm to about 2500 nm. Monitoring system 116 is configured to process the retroreflected light to generate an output signal identifying substrate 114. As one example, monitoring system 116 may generate an optical image from the retroreflected light and only process a region of the optical image around the location to identify substrate 114. In some instances, the output signal may provide at least one of a visible indication, an audible indication, and a haptic indication to a driver of vehicle 110B. Additionally, or alternatively, the output signal may be uploaded on an internet server from where it can be transmitted to nearby vehicles 110, micro-mobility devices 106, infrastructure articles 104, traffic systems, warning systems, and the like.

In some examples, monitoring system 116 may determine a type of location in which substrate 114 (such as micro-mobility device 106 in the example of FIG. 1) is currently located based on the sensor data. Further, an operation of vehicle 110B may be controlled based at least in part on the type of the location. Example types of locations include transportation pathways 102, parks, interiors of buildings, parking lots, etc. Monitoring system 116 may determine the type of location in which micro-mobility device 106 is located based on image data (e.g., images and/or videos) generated by one or more image sensors. Monitoring system 116 may perform one or more image processing algorithms on the image data to identify the type of the location. For instance, the image data may include an image of one or more infrastructure articles 104 proximate to micro-mobility device 106. In an instance, monitoring system 116 may determine that the type of location in which micro-mobility device 106 is located is a bicycle pathway based on the image data. Further, monitoring system 116 may perform image processing to identify infrastructure articles 104A as pavement markings (also referred to as lane markings). Monitoring system 116 may determine that the type of location in which micro-mobility device 106 is located is a bicycle pathway in response to determining that micro-mobility device 106 is between two pavement markings. In other words, in one example, monitoring system 116 may determine that transportation pathway 102B is a bicycle pathway, and hence the type of location in which micro-mobility device 106 is located is a bicycle pathway. In some instances, monitoring system 116 determines micro-mobility device 106A is located within a bicycle pathway based on the characteristics (e.g., color, width, double vs single line, distance between, etc.) of infrastructure articles 104. Additional details of analyzing infrastructure data are described in U.S. Provisional Patent Application 62/622,469, filed Jan. 26, 2018, and U.S. Provisional Patent Application 62/480, 231, filed Mar. 31, 2017, each of which is hereby incorporated by reference in their entirety.

Monitoring system 116 may determine a distance between infrastructure articles 104. For instance, monitoring system 116 may calculate a number of pixels between infrastructure articles 104 and calculate the number of pixels associated with a known or typical dimension (e.g., width) of a reference object (e.g., infrastructure article 104A) captured in one or more images of the image data. In such instances, monitoring system 116 may compare the number of pixels between infrastructure articles 104 to the number of pixels associated with the reference object to determine the distance between infrastructure articles 104. As such, in one example, monitoring system 116 may determine that the type of location in which micro-mobility device 106A is located is a bicycle pathway in response to determining that the distance between infrastructure articles 104A corresponds to a width of a bicycle pathway.

In some examples, monitoring system 116 determines a type of transportation pathway 102 based on characteristics of transportation pathway 102. For example, monitoring system 116 may determine a color of transportation pathway 102B and determine that transportation pathway 102B is a bicycle pathway based on the color. In another example, monitoring system 116 may identify a symbol on the surface of transportation pathway 102B between infrastructure articles 104A and determine that transportation pathway 102B is a bicycle pathway based on the symbol.

In some instances, the image data includes data indicative of the article message. Monitoring system 116 may determine the type of location in which micro-mobility device 106 is located based on the article message. For instance, the article message may indicate a type of infrastructure article 104B, a type of transportation pathway 102C associated with infrastructure article 104B, or both. In one instance, monitoring system 116 may determine the type of location in which micro-mobility device 106 is located is a bicycle pathway based on the article message.

Monitoring system 116 may determine a type of location in which micro-mobility device 106 is currently located based at least in part on detecting one or more vehicles 110, pedestrians 112, micro-mobility devices 106, and/or bicycles. Monitoring system 116 may detect one or more vehicles 110 based on the image data or other signature data. For example, monitoring system 116 may perform image processing on the image data to detect one or more vehicles 110 and may determine transportation pathway 102A is a vehicle pathway. As another example, monitoring system 116 may perform image processing on the image data and determine that transportation pathway 102C includes pedestrians 112. In such examples, monitoring system 116 may determine that transportation pathway 102C is a pedestrian pathway. Similarly, monitoring system 116 may determine that transportation pathway 102B is a bicycle pathway in response to detecting bicycles and/or micro-mobility devices 106. Thus, monitoring system 116 may determine on which of transportation pathways 102 micro-mobility device 106 is located based on the image data.

In some scenarios, monitoring system 116 may determine a type of location in which micro-mobility device 106A is located based on communication data received from a monitoring system separate from vehicle 110B, such as another vehicle 110C, an infrastructure article 104, or a micro-mobility device 106. In some examples, monitoring system 116 receives the communication data via a dedicated short-range communication (DSRC) transceiver. Additionally, or alternatively, monitoring system 116 may receive communication data via any wireless communication device, such as a BLUETOOTH device, a WIFI device, a GPS device, among others. For instance, the communication data may include data indicating that the type of the location is a transportation pathway 102. In one instance, the communication data indicates GPS coordinates of micro-mobility device 106 (e.g., GPS coordinates) and monitoring system 116 may determine the type of location based on the GPS coordinates. In another example, the communication data may indicate a type of the sending device and monitoring system 116 may determine the type of location for micro-mobility device 106A based on the type of the sending device. For example, the communication device may indicate the sending device is a vehicle 110, such as a lorry or semi-truck. In such examples, monitoring system 116 may determine that micro-mobility device 106A is located on a transportation pathway 102 in response to determining that the sending device is a vehicle 110. In some instances, the communication data includes data which was received from vehicles 110, infrastructure articles 104, or other micro-mobility devices 106 that travelled proximate to the current location of micro-mobility device 106A within a particular time duration of micro-mobility device 106A arriving at its current location.

In some examples, the communication data may include data indicating a type of a roadway, a size of the roadway (e.g., a number of lanes), a speed of the vehicle 110, a speed limit for the roadway, among others. In some examples, the data indicating the type of the roadway may include data indicating the presence of an accident, the presence of a construction zone, the direction, speed, or congestion of traffic, road surface type, types of vehicles permitted or present on the roadway, number of lanes, complexity of traffic, or a combination thereof. For example, monitoring system 116 may receive data from vehicles 110 indicating a type of transportation pathway 102.

In some examples, monitoring system 116 determines whether micro-mobility device 106A is permitted in the location in which micro-mobility device 106A is currently located. For example, monitoring system 116 may determine whether micro-mobility device 106A is permitted in its current location based on the type of the current location and one or more rules. The rules may be pre-programmed or machine generated (e.g., using trained or untrained machine learning models). In some scenarios, monitoring system 116 determines based on the rule(s) that micro-mobility device 106A is permitted in certain types of locations and is not permitted (e.g., may be prohibited) in other types of locations. For instance, monitoring system 116 may determine that micro-mobility device 106A is permitted in its current location when micro-mobility device 106A is located on one of transportation pathways 102. Similarly, monitoring system 116 may determine that micro-mobility device 106A is not permitted in its current location when micro-mobility device 106A is located within a building or on an athletic field (e.g., a baseball field, soccer field, etc.).

Micro-mobility device 106A may be permitted in a subset of one type of locations and may not be permitted in a different subset of the type of locations. For example, monitoring system 116 may determine based on the rules that micro-mobility device 106A is permitted on transportation pathways 102A and 102B and that micro-mobility device 106A is not be permitted on transportation pathway 102C. In another example, monitoring system 116 may determine that micro-mobility device 106A is not permitted in a construction zone 118 (or any other temporary traffic control zone).

Alternatively or additionally to determining whether micro-mobility device 106A is permitted in its current location based on the type of the current location, in some scenarios, monitoring system 116 determines whether micro-mobility device 106A is permitted in its current location based at least in part on the presence of a vehicle 110, micro-mobility devices 106, pedestrian 112, or a combination thereof. For example, monitoring system 116 may determine that micro-mobility device 106A is not permitted in its current location in response to detecting one or more of vehicles 110, micro-mobility devices 106, or pedestrians 112.

Monitoring system 116 may perform an operation based at least in part on the type of location in which micro-mobility device 106A is located, whether micro-mobility device 106A is permitted in its current location, a type of a roadway, presence of vehicles 110, pedestrians 112, and/or other micro-mobility devices 106, or a combination thereof.

In some examples, monitoring system 116 performs an operation to adjust operation of the vehicle 110B. For example, monitoring system 116 may perform an operation based on the type of location and/or in response to determining that micro-mobility device 106A in not permitted in the location in which it is currently located. For example, monitoring system 116 may cause the vehicle 110B to adjust (e.g., increase or decrease) the speed. In one scenario, monitoring system 116 adjusts a maximum allowable speed based on the type of location. For example, monitoring system 116 may enable the vehicle 110B to drive at a first speed when micro-mobility device 106A is located on a pedestrian pathway (e.g., pathway 102C) and may enable the vehicle 110B to drive at a different (e.g., lower) speed when micro-mobility device 106A is located on a vehicle pathway (e.g., pathway 102A). In another example, monitoring system 116 may perform an operation to adjust braking of vehicle 110B based on the type of location.

Monitoring system 116 may perform the at least one operation based at least in part on whether monitoring system 116 detected the presence of vehicles 110, pedestrians 112, and/or other micro-mobility devices 106. For example, monitoring system 116 adjusts a speed of vehicle 110B in response to detecting pedestrian 112, for example, regardless of the type of location in which micro-mobility device 106A is located.

Monitoring system 116 may perform the at least one operation by generating the output signal. For example, the output signal may include an audio output, a visual output, a haptic output, or a combination thereof. As one example, monitoring system 116 may output a visual alert via one or more LED lights, an audible signal, or a haptic alert (e.g., causing a steering mechanism of vehicle 110B to vibrate) indicating that micro-mobility device 106A is not permitted in its current location.

In some examples, monitoring system 116 outputs a message to a remote device separate from vehicle 110B. The message may indicate that micro-mobility device 106A is currently located in a location in which it is not permitted. The message may indicate an amount of time that micro-mobility device 106A has been in its current location, the current location of micro-mobility device 106A, among other information.

In some instances, monitoring system 116 determines an amount of time that micro-mobility device 106A has been in a location in which micro-mobility device 106A is not permitted. Monitoring system 116 may perform the at least one operation in response to determining that the amount of time satisfies (e.g., is greater than or equal to) a threshold time duration. For example, monitoring system 116 may generate an output and/or adjust a speed of the vehicle 110B in response to determining that micro-mobility device 106A has been located in an impermissible location for at least the threshold time duration. Monitoring system 116 may determine a confidence level indicating a probability that micro-mobility device 106A has been in a location in which micro-mobility device 106A is not permitted. Monitoring system 116 may perform the at least one operation in response to determining that the confidence level satisfies (e.g., is greater than or equal to) a threshold confidence level. For example, monitoring system 116 may generate an output and/or adjust a speed of the vehicle 110B in response to determining that confidence level satisfies the threshold confidence level.

While monitoring system 116 is described as dynamically controlling vehicle 110B, techniques of this disclosure may enable a monitoring system to control any other type of vehicle 110, micro-mobility device 106, or an infrastructure article 104.

Figure 2:
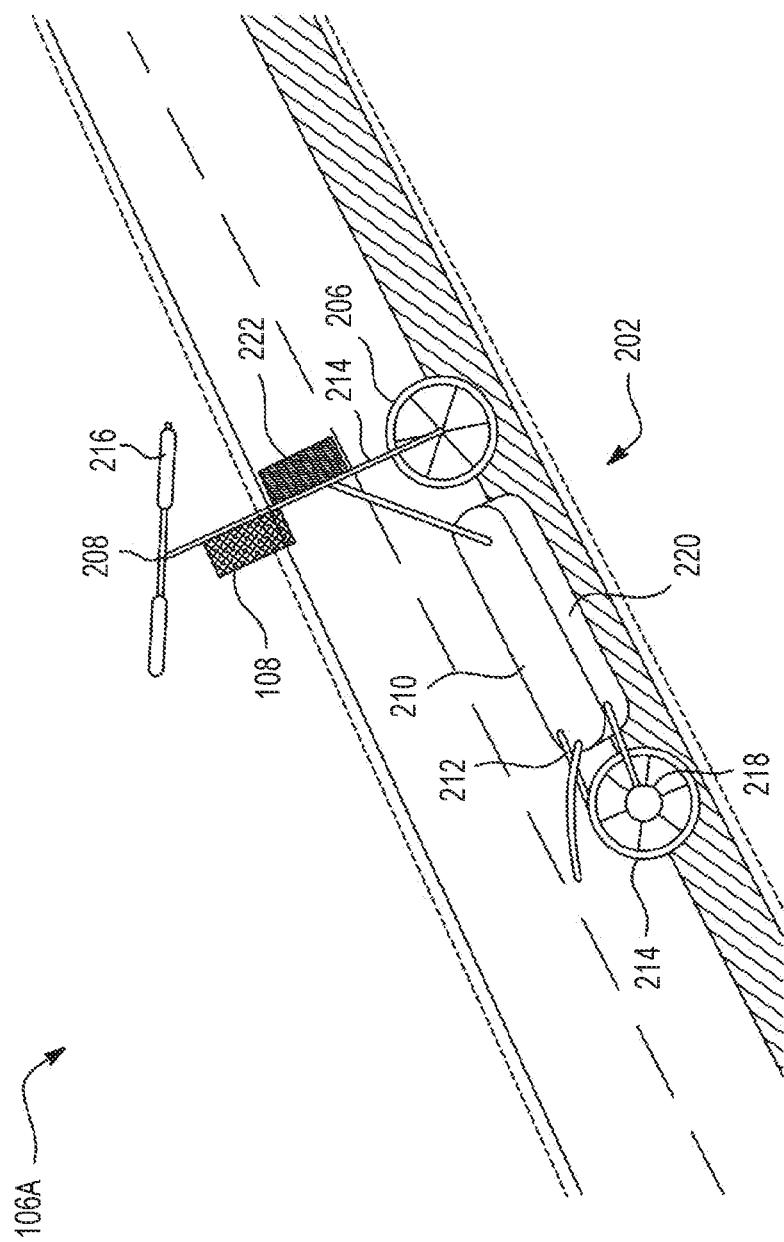
FIG. 2 is a schematic diagram illustrating an example micro-mobility device, in accordance with techniques of this disclosure.

FIG. 2 is a schematic diagram of micro-mobility device 106A. Micro-mobility device 106A include a chassis 202, a rear wheel 204, a front wheel 206, and a steering assembly 208. Chassis 202 includes chassis support member 210 extending substantially horizontally between a rear-wheel mount 212 at one end of chassis 202 and a front-wheel mount 214 at another end of chassis 202 that is opposite the rear-wheel mount 212.

In the example of FIG. 2, rear wheel 204 is mounted to rear wheel mount 212 and front wheel 206 is mounted to front wheel mount 214. Front wheel 206 is mounted to front wheel mount 214 for turning steering movement with respect to the front wheel mount 206 and rear wheel 204. Front wheel mount 214 may be coupled to steering assembly 208. Steering assembly 408 may extend generally vertically relative to chassis support member 210. Steering assembly 408 may be angled relative to chassis support member 210. In one example, an angle between chassis support member 210 and steering assembly 208 is between approximately 60 degrees to approximately 90 degrees. Steering assembly 208 may include handlebars 216. Steering assembly 208 may be coupled to front wheel mount 214 such that turning handlebars 216 may cause front wheel 206 to turn.

Micro-mobility device 106A includes at least one electric motor 218, at least one motor controller 220, and at least one battery 222. Motor controller 220 may be operatively coupled to electric motor 218 to drive rear wheel 204 and/or front wheel 206. In the example of FIG. 2, electric motor 218 is configured to drive rear wheel 204, in some examples, electric motor 218 may be configured to drive front wheel 206. In one example, micro-mobility device 106A includes a plurality of motors that are each configured to drive a respective wheel.

Micro-mobility device 106A may include a braking apparatus. The braking apparatus is operatively coupled to rear wheel 204 to selectively slow and/or stop rear wheel 204. In some examples, micro-mobility device 106A includes a braking apparatus coupled to front wheel 206.

Micro-mobility device 106A includes radar-optical fusion article 108 (also referred to as, article 108). Article 108 is configured to provide a signature to incoming light and/or the electromagnetic wave to enable better detection of micro-mobility device 106A. Article 108 provides more conspicuity to micro-mobility device 106A. The information received from article 108 may be used by vehicles 110, infrastructure articles 104, other micro-mobility devices 106, or pedestrians 112 to be more aware of their surroundings and avoid collisions. In other examples, article 108 may provide more conspicuity to substrate 114 with which article 108 is attached.

Figure 3A:
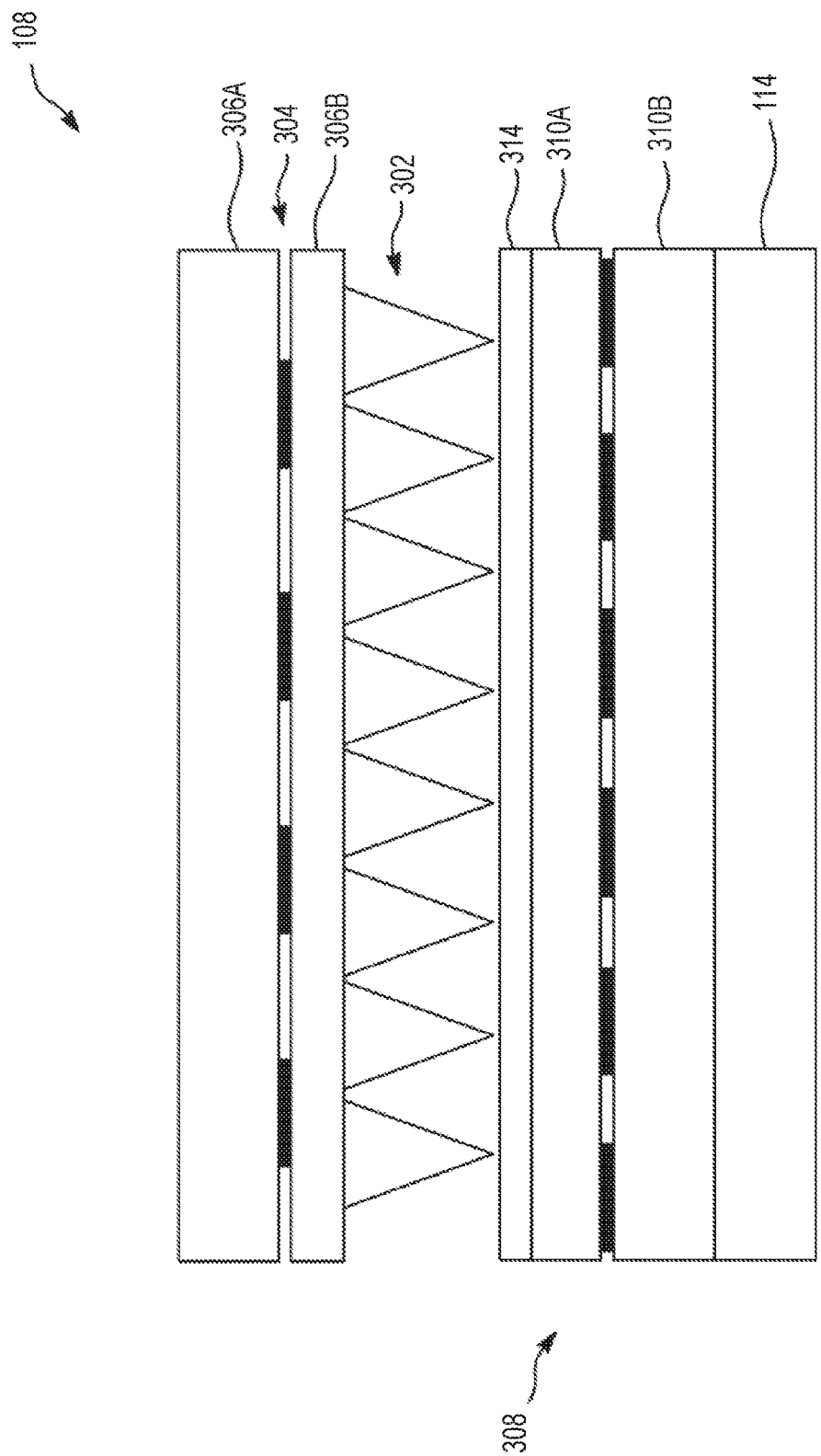
FIG. 3A is a schematic diagram illustrating examples of radar-optical fusion article, in accordance with techniques of this disclosure.

FIG. 3A is a schematic illustrating cross section of a radar-optical fusion article 108 (also referred to as, article 108) attached to substrate 114, in accordance with techniques of this disclosure. Article 108 includes a first retroreflective layer 302 configured to retroreflect at least a portion of light incident on first retroreflective layer 302. The light has a wavelength in a range from about 400 nm to about 2500 nm. In one example, first retroreflective layer 302 is configured to retroreflect at least a portion of light to a first transceiver (described in more detail with reference to FIG. 6). First retroreflective layer 302 may be a retroreflective sheeting, for example, 3M™ Diamond Grade™ DG³ Reflective Sheeting Series 4000, 3M™ High Definition License Plate Sheeting Series 6700, and 3M™ Scotchlite™ Reflective Material 8987. In some instances, first retroreflective layer 302 may be a cube corner retroreflective sheeting including a body portion typically having a substantially planar front surface and a structured rear surface having a plurality of cube corner elements. Each cube corner element includes three approximately mutually perpendicular optical faces to retroreflect incident light. In some instances, first retroreflective layer 302 may be a microsphere-containing retroreflective sheeting.

In some instances, the retroreflected light includes a light signature associated with substrate 114. In some instances, the retroreflected light from first retroreflective layer 302 has a wavelength in a range from about 700 nm to about 2500 nm. The light signature may be based on at least one of a spatial pattern, a wavelength-selective signature, an angle-dependent signature and a polarization-specific signature. The spatial pattern may be a message encoded via a 2-dimensional bar code, such as a QR code. The light signature may be detected by an image sensor or an image capture device (e.g. a camera). The light signature may be processed further to identify substrate 114. The light signature may be indicative of at least one of a location of substrate 114, a type of substrate 114, and an environment of substrate 114.

In one example, an optical code 304 (e.g. a wavelength-selective spatial signature) is formed by permanent or temporary attachment of one or more visibly transparent, near-infrared (IR) reflecting multilayer optical films to first retroreflective layer 302. Such attachment may occur by, for example, use of an adhesive 306A and/or 306B. Adhesives 306A and 306B are substantially transparent in the selected wavelength range that the multilayer optical film reflects. In some examples, adhesives 306A and 306B may be optically clear adhesive (OCA). The use of such wavelength-selective multilayer optical films on first retroreflective layer 302 causes near-infrared light incident on article 108 to be reflected from the otherwise retroreflective light path and thus creates regions of high contrast on article 108 when viewed with near-infrared light. The multilayer optical films are effectively IR-reflecting mirrors with high transmission through the visible spectrum of light. As the multilayer optical films are not significantly visible in the visible light spectrum, the wavelength-selective signature (e.g., graphics, indicia, pattern, image) created using the multilayer optical films is not visible to the human eye in the visible light spectrum. As such, the multilayer optical films can be used to create covert or hidden wavelength-selective signatures on article 108 that can act as substrate identifiers in automated vision or automated recognition systems. Examples of code-containing retroreflective sheeting, which may be used with techniques and systems of this disclosure, include a multilayer optical film as disclosed in U.S. Pat. No. 8,865,293, issued Oct. 21, 2014; U.S. Provisional Patent Application 62/702,642, filed Jul. 24, 2018; U.S. Provisional Patent Application 62/702,672, filed Jul. 24, 2018, each of which is hereby incorporated by reference in their entirety. In some instances, first retroreflective layer 302 may include retroreflective sheeting configured to provide a light signature including a polarization-specific signature. For example, the retroreflective sheeting may be configured to linearly polarize (e.g., horizontally or vertically) or circularly polarize the incident light, such as those disclosed in PCT Publications WO2018151761A1, WO2019082130A1, and WO2019082162A1, each of which is hereby incorporated by reference in their entirety. In some examples, the light signature may be an angle-dependent signature associated with light incident at certain angles, such as those disclosed in PCT Publication WO2019084297A2, U.S. Provisional Patent Application 62/838,569, filed Apr. 25, 2019 and U.S. Provisional Patent Application 62/838,580, filed Apr. 25, 2019, each of which is hereby incorporated by reference in their entirety.

Referring to FIG. 3A, article 108 includes a second retroreflective layer 308 disposed adjacent to first retroreflective layer 302. Second retroreflective layer 308 is configured to retroreflect at least a portion of an electromagnetic wave having a frequency in the range from about 0.5 GHz to about 100 GHz. In one example, second retroreflective layer 308 is configured to retroreflect at least a portion of the electromagnetic wave to a second transceiver (described in more detail with reference to FIG. 6). In some instances, the retroreflected electromagnetic wave includes an electromagnetic signature associated with substrate 114. In some instances, the electromagnetic wave is a radar wave and the retroreflected radar wave includes a radar signature associated with substrate 114. In an example, the retroreflected electromagnetic wave from second retroreflective layer 308 has a frequency in a range from about 75 GHz to about 81 GHz. The radar signature may be at least one of a frequency signature, a polarization signature, a temporal signature and an angle-dependent signature. For example, the retroreflected electromagnetic wave may have a frequency of about 76 GHz indicating a location of substrate 114 to which article 108 is attached.

In one example, second retroreflective layer 308 includes a retroreflective antenna array disposed between adhesives 310A and 310B. A simple type of retroreflective radar antenna is the Van Atta array. It was first introduced by L. C. Van Atta, U.S. Pat. No. 2,908,002, "Electromagnetic Reflector", Oct. 6, 1959. Van Atta array is made up of an array of passive antenna elements that are connected in pairs by transmission lines, with the members of each pair located symmetrically with respect to the array center. The incident electromagnetic field received by each antenna element feeds its corresponding antenna element via a transmission line, resulting in a reradiated electromagnetic field. The transmission lines are configured so that the phase distribution of the reradiated fields is the reverse of the received fields, which results in the reradiated wave propagating back towards the incident direction.

In another example, second retroreflective layer 308 includes a diffraction grating array disposed between adhesives 310A and 310B. When illuminated by a radar signal, a metallic sign, whose dimensions are much greater than the radar wavelength, will scatter the radar signal in virtually all directions. A major portion of the signal will be scattered in the specular direction. Smaller levels will be scattered in other directions due to diffraction when the excited currents on the sign reach the edges. Increasing the scatter in the direction of the incident signal typically requires modification of the sign. One way to do this is to introduce elements on the sign that form a diffraction (or blaze) grating. The figure provided in the priority PCT application schematically shows such a structure.

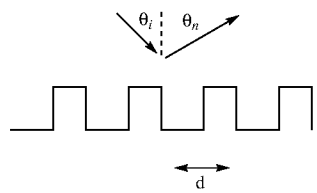

In this case the grating consists of rectangular grooves in either a conducting or dielectric sheet. This may produce a periodic structure of elements that are capable of scattering electromagnetic energy. For backscatter, i.e., $\theta_n = \theta_i$, the element spacing should satisfy $$\sin(\theta_i) = \frac{\lambda}{2d}$$

where $\lambda$ is the wavelength of the incident electromagnetic field. For a roadside sign or similar application, there are a number of ways of implementing this. One employs short circuited dipoles (typically a half wavelength long) that are placed in a rectangular grid. With a sign, these dipoles may be spaced away and parallel to the sign. The spacer can be a dielectric sheet. The figure provided in the priority PCT application shows an example.

This is a top view. The thin, regularly spaced "lines" are the dipoles. The shaded area represents the dielectric spacer. Below the spacer (not shown) may a metal ground plane. For this structure, the incident wave is assumed to come from the left along the x-axis. The dipole spacing along the x dimension is given by the above equation and depends upon the assumed incidence angle. In this situation, the dipole spacing along the y dimension is somewhat arbitrary (a wavelength in this case). Other elements can be used such as slots in the ground plane, periodic "holes" in the dielectric, etc.

The retroreflective antenna array and/or the diffraction grating array may be manufactured using traditional plating and etching process, using a printing process with a metallic ink or an ink containing a metal precursor, or using patterned adhesion process as those disclosed in U.S. Provisional Patent Application 62/702,642, filed Jul. 24, 2018 and U.S. Provisional Patent Application 62/702,672, filed Jul. 24, 2018, each of which is hereby incorporated by reference in their entirety. In one instance, the retroreflective antenna array may include a transferable thin metal (as described in more detail with reference to FIGS. 3B and 3C).

Referring to FIG. 3A, article 108 may have a filter layer 314 disposed between first retroreflective layer 302 and second retroreflective layer 308. Filter layer 314 may include a plurality of elements (as described in more detail with reference to FIGS. 4 and 5) configured to provide a filtered signal including an electromagnetic signature associated with substrate 114. The electromagnetic signature may be at least one of a frequency signature, a polarization signature, a temporal signature, and an angle-dependent signature.

FIG. 3B is a schematic illustrating a cross section of an exemplary second retroreflective layer 308, in accordance with techniques of this disclosure. Article 108 includes an adhesive 316 with a first surface adjacent to second retroreflective layer 308. In some instances, adhesive 316 in FIG. 3B is same as adhesive 310B in FIG. 3A. Adhesive 316 includes a transferable thin metal 318A secured to the first surface of adhesive 316 at a first region and a barrier 320 on a second region of the first surface of adhesive 316. The pattern made from the first region includes transferable thin metal 318A functioning as second retroreflective layer 308. In some instances, transferable thin metal 318A includes a selective-bonding layer to facilitate the transfer of the thin metal layer to the first region of the first surface of adhesive 316. Transferable thin metal 318A may have a thickness in a range from about 10 nm to about 500 nm. Exemplary pre-made film containing the transferable thin metal includes a selective-bonding layer is described in Working Example 2.4.1 Part A of PCT Publication WO2019084295A1, which is hereby incorporated by reference in its entirety. The selective-bonding layer is further described in PCT Publications WO2018178802A1 and WO2018178803A1, which are each hereby incorporated by reference in its entirety. Exemplary patterned adhesion process to produce second retroreflective layer 308 as illustrated in FIG. 3B is described in U.S. Provisional Patent Application 62/702,642, filed Jul. 24, 2018, which is hereby incorporated by reference in their entirety.

FIG. 3C is a schematic illustrating a cross section of another exemplary second retroreflective layer 308, in accordance with techniques of this disclosure. In this example, an adhesive 322 has a first surface adjacent to first retroreflective layer 302 in a first region. A transferable thin metal 318B similar to those described for transferable thin metal 318A is secured to a second surface of adhesive 322. The pattern made from the first region includes transferable thin metal 318B functioning as second retroreflective layer 308. Exemplary patterned adhesion process to produce second retroreflective layer 308 as illustrated in FIG. 3C is described in U.S. Provisional Patent Application 62/702,672, filed Jul. 24, 2018, which is hereby incorporated by reference in their entirety. In some instance, the selective-bonding layer (not shown) may be aligned on an opposite surface of transferable thin metal 318B after the transfer process.

Figure 4:
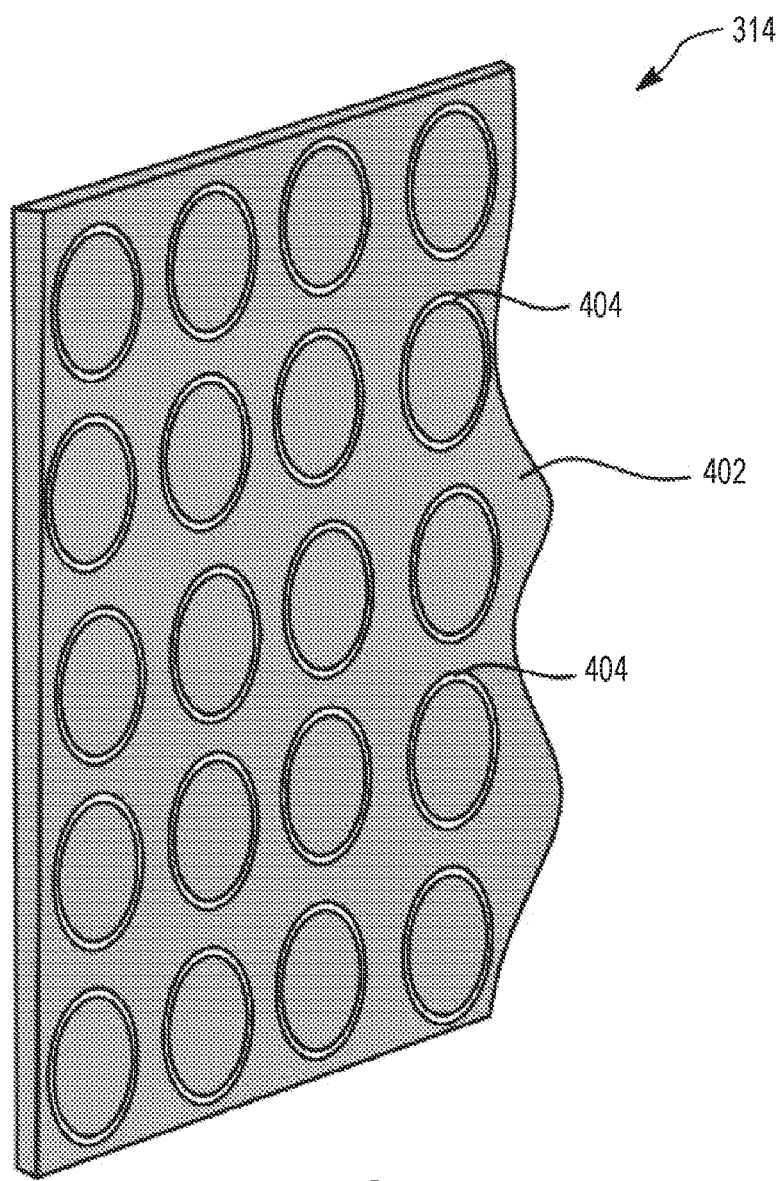
FIG. 4 is a schematic diagram illustrating a filter layer of the radar-optical fusion article, in accordance with techniques of this disclosure.

FIG. 4 is a schematic illustrating filter layer 314, in accordance with techniques of this disclosure. Filter layer 314 may be a frequency selective surface configured to selectively allow electromagnetic signals of certain frequencies to pass therethrough. Frequency selective surface may be constructed as a plane surface having a series of identical elements arranged in a one-dimensional or two-dimensional array. In one instance, frequency selective surface may be designed using an array of apertures on a thin metallic sheet. This frequency selective surface acts as a bandpass filter as it allows only certain frequencies within a band to pass through the apertures. In the example of FIG. 4, filter layer 314 includes a metallic sheet 402 having apertures 404. Apertures 404 allow electromagnetic signals that have frequencies within a frequency band (for example, 75 GHz to 81 GHz) to pass therethrough. Thus, filter layer 314 acts as a bandpass filter in this example.

FIGS. 5A to 5F illustrate various examples of filter layer 314, in accordance with techniques of this disclosure. In these examples, filter layer 314 includes a frequency selective surface implemented using metallic patches 502 (also referred to as elements 502) on a dielectric 504. This frequency selective surface acts as a bandstop filter as it reflects certain frequencies within a frequency band. For example, filter layer 314 may act as a bandstop filter configured to reflect the electromagnetic signals having frequencies falling in a frequency band (for example, 75 GHz to 81 GHz) and to pass the electromagnetic signals having frequencies outside the frequency band therethrough.

Figure 5A:
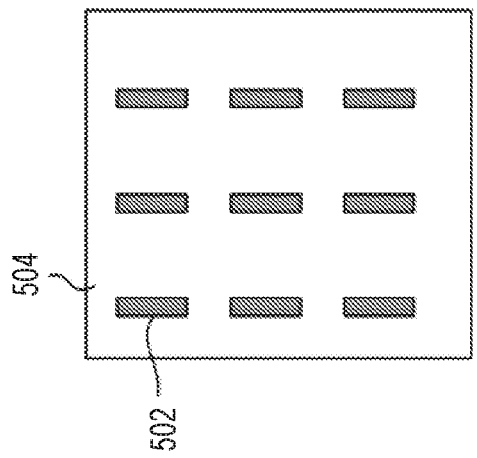
FIGS. 5A to 5F are schematic diagrams illustrating various examples of the filter layer, in accordance with techniques of this disclosure.
Figure 5D:
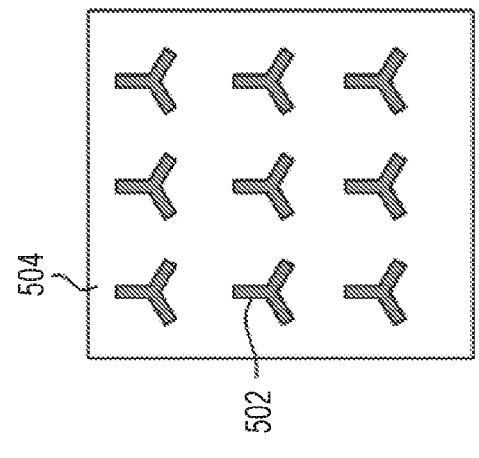
Figure 5B:
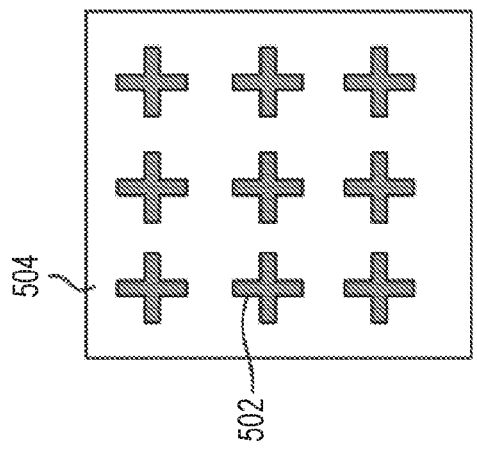
Figure 5E:
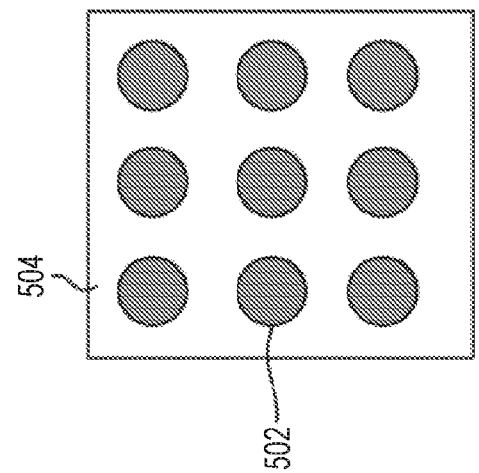
Figure 5C:
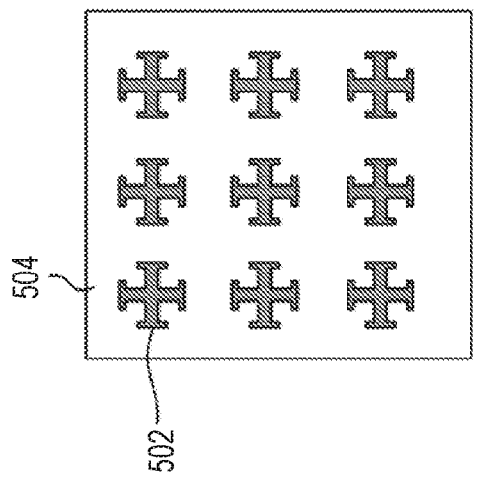
Figure 5F:
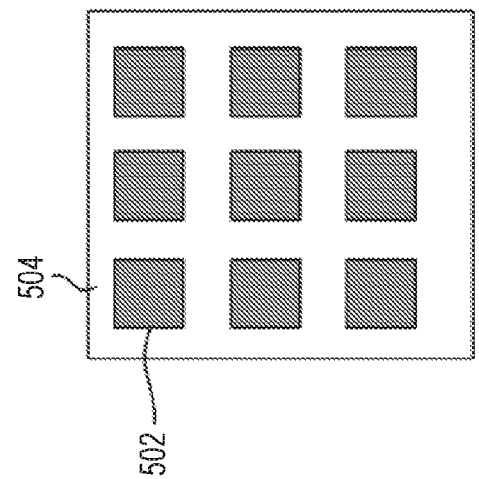

FIG. 5A illustrates filter layer 314 implemented using elements 502 in the shape of a dipole on dielectric 504. FIG. 5B illustrates filter layer 314 implemented using elements 502 in the shape of a crossed dipole on dielectric 504. FIG. 5C illustrates filter layer 314 implemented using elements 502 in the shape of a Jerusalem cross on dielectric 504. FIG. 5D illustrates filter layer 314 implemented using elements 502 in the shape of a tripole on dielectric 504. FIG. 5E illustrates filter layer 314 implemented using elements 502 in the shape of a circle on dielectric 504. FIG. 5F illustrates filter layer 314 implemented using elements 502 in the shape of a rectangle on dielectric 504.

FIG. 6 illustrates monitoring system 116 (also referred to as, system 116) in accordance with techniques of this disclosure. System 116 may be mounted on infrastructure article 104 or vehicle 110 (for example, vehicle 110B as shown in FIG. 1). System 116 may be provided with sensors such as image sensors, temperature sensors, LiDAR, RADAR, or a combination thereof, to name only a few examples of sensors. Examples of image sensors may include semiconductor charge-coupled devices (CCD) or active pixel sensors in complementary metal-oxide-semiconductor (CMOS) or N-type metal-oxide-semiconductor (NMOS, Live MOS) technologies. In one example, system 116 or vehicle 110B includes at least two different sensors for detecting electromagnetic radiation in two different wavelength spectra. Image sensors may have a fixed field of view or may have an adjustable field of view. An image sensor with an adjustable field of view may be configured to pan left and right, up and down relative to vehicle 110B as well as be able to widen or narrow focus. In some examples, image sensors may include a first lens and a second lens. System 116 and/or vehicle 110B may have more or fewer sensors in various examples.

System 116 includes a first transceiver 602 configured to emit and receive at least portion of light having a wavelength in a range from about 400 nm to about 2500 nm. The light is retroreflected from first retroreflective layer 302 of radar-optical fusion article 108 configured for attachment to substrate 114. As an example, first transceiver 602 may be an image capture device which generates an optical image. In some instances, first transceiver 602 may not be configured to emit light. For example, headlight emitted by a headlamp of vehicle 110B may be retroreflected by first retroreflective layer 302 which is then received by first transceiver 602.

System 116 further includes a second transceiver 604 configured to emit and receive at least a portion of an electromagnetic wave having a frequency in a range from about 0.5 GHz to about 100 GHz. The electromagnetic wave is retroreflected from second retroreflective layer 308 of radar-optical fusion article 108. In some instances, second transceiver 604 may not be configured to emit electromagnetic wave. For example, an electromagnetic wave emitted by a sensor of vehicle 110B may be retroreflected by second retroreflective layer 308 which is then received by second transceiver 604.

System 116 includes a controller 606 communicatively coupled to first transceiver 602 and second transceiver 604. Controller 606 is configured to process the retroreflected electromagnetic wave received by second transceiver 604 to determine a location of substrate 114. In an example, controller 606 may be configured to process the retroreflected electromagnetic wave to determine a property of substrate 114 with which article 108 is attached. In some instances, controller 606 may process the electromagnetic signature of the retroreflected electromagnetic wave to generate a low-resolution spatial image indicating a location of substrate 114. Based on the location of substrate 114, controller 606 is configured to control first transceiver 602 to receive the retroreflected light from first retroreflective layer 302. For example, controller 606 may be configured to steer first transceiver 602 towards a direction of substrate 114. In some instances, controller 606 may control first transceiver 602 after a time lag (for example, 10 seconds) upon determining the location of substrate 114. Alternatively, controller 606 may immediately control first transceiver 602 upon determining the location of substrate 114.

Controller 606 is configured to process the retroreflected light received by first transceiver 602 to generate an output signal identifying substrate 114. In one example, controller 606 may receive an optical image from first transceiver 602 and process only a region of the optical image corresponding to the location of substrate 114. For example, image processing algorithms may be used by controller 606 to analyze only those regions of the optical image that have a subject such as a human.

In some instances, controller 606 may determine the presence of a light signature in the retroreflected light. Light signature may be based on at least one of a spatial pattern, a wavelength-selective signature, an angle-dependent signature and a polarization-specific signature. Light signature may be used to identify substrate 114 with more accuracy. For example, controller 606 may determine a particular light signature and accordingly identifies the substrate as a micro-mobility device. In some instances, controller 606 may have a lookup table containing a correspondence between various types of light signatures and/or electromagnetic signatures and types of substrate 114. For example, a first light signature including a particular optical code may correspond to micro-mobility devices 106 and a second light signature including a particular wavelength-selective signature may correspond to vehicles 110. The lookup table may be stored in monitoring system 116 or may be downloaded in monitoring system 116 from an internet server.

The output signal may provide at least one of a visible indication, an audible indication and a haptic indication. For example, controller 606 may generate a vibration on the steering wheel of vehicle 110B to alert the driver about the location of substrate 114. Controller 606 may be configured to provide the output signal to vehicle 110B, other vehicles 110A, 110C, or upload the output signal on an internet server. The output signal may be forwarded to traffic monitoring systems, warning systems, automatic driving assistance systems, and the like.

System 116 may have communication units 608A, 608B to communicate with external devices by transmitting and/or receiving data. For example, system 116 may use communication units 608A, 608B to transmit and/or receive radio signals on a radio network, such as a cellular radio network or other networks. In some examples, communication units 608A, 608B may transmit and receive messages and information to other vehicles, such as information interpreted from infrastructure article 104. In some examples, communication units 608A, 608B may transmit and/or receive satellite signals on a satellite network, such as a Global Positioning System (GPS) network. In some examples, communications units 608A, 608B may transmit and/or receive data through network to a remote computing system. In some examples, micro-mobility device 106A and system 116 are communicatively coupled to one another via a network. In another example, micro-mobility device 106A and system 116 are communicatively coupled to one another directly, for example, via a DSRC transceiver.

Controller 606 may include one or more processors, storage devices, communication units, input components, and output components. Processors, input components, storage devices, communication units, and output components may each be interconnected by one or more communication channels. Communication channels may interconnect each of these components and other components for inter-component communications (physically, communicatively, and/or operatively). In some examples, communication channels may include a hardware bus, a network connection, one or more inter-process communication data structures, or any other components for communicating data between hardware and/or software.

One or more processors of controller 606 may implement functionality and/or execute instructions. For example, processors on controller 606 may receive and execute instructions stored by storage devices. These instructions executed by processors may cause controller 606 to store and/or modify information, within storage devices during program execution.

Figure 7:
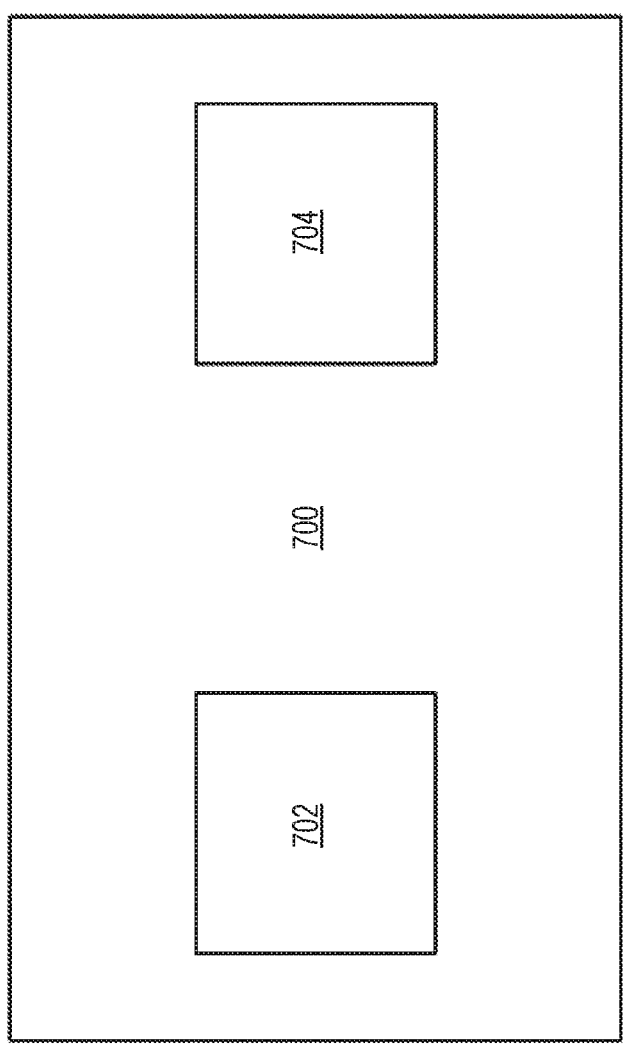
FIG. 7 is a block diagram of a computing device for identifying the radar-optical fusion article, in accordance with techniques of this disclosure.

FIG. 7 illustrates a computing device 700, in accordance with techniques of this disclosure. Computing device 700 includes an interpretation component 702 and a control component 704. Components 702, 704 includes one or more computer processors, and a memory to store instructions to be executed by the computer processors. Components 702, 704 may perform operations described herein using software, hardware, firmware, or a mixture of both hardware, software, and firmware residing in and executing on computing device 700 and/or at one or more other remote computing devices. In some examples, components 702, 704 may be implemented as hardware, software, and/or a combination of hardware and software.

Computing device 700 may execute components 702, 704 with one or more processors. Computing device 700 may execute any of components 702, 704 as or within a virtual machine executing on underlying hardware. Components 702, 704 may be implemented in various ways. For example, any of components 702, 704 may be implemented as a downloadable or pre-installed application or "app." In another example, any of components 702, 704 may be implemented as part of an operating system of computing device 700.

According to techniques of this disclosure, interpretation component 702 may determine a location of substrate 114 to which radar-optical fusion article 108 is attached. Interpretation components 702 may receive, from sensors data indicative of article 108 proximate to vehicle 110B. Interpretation component 702 may identify substrate 114 and/or article 108 using one or more image processing algorithms.

Interpretation component 702 processes at least a portion of light having a wavelength in a range from about 400 nm to about 2500 nm. The light is retroreflected from first retroreflective layer 302 of radar-optical fusion article 108 attached to a substrate 114. Further, interpretation component 702 processes at least a portion of an electromagnetic wave having a frequency in the range from about 0.5 GHz to about 100 GHz, wherein the electromagnetic wave is retroreflected from second retroreflective layer 308 disposed adjacent to first retroreflective layer 302. Interpretation component 702 determines a location of substrate 114 based on the processing of the retroreflected electromagnetic wave. Control component 704 controls first transceiver 602 to receive the retroreflected light from first retroreflective layer 302 based on the location of substrate 114. The retroreflected electromagnetic wave from second retroreflective layer 308 is received by second transceiver 604.

In some instances, control component 704 steers first transceiver 602 by physically moving first transceiver 602 towards the direction of substrate 114. Control component 704 may steer first transceiver 602 after a time lag upon determining the location of substrate 114.

In an example, control component 704 may control first transceiver 602 to generate an optical image and to analyze a region of the optical image corresponding to the location of substrate 114. Image processing algorithms may be employed to process only those regions of the optical image that have a subject, for example, a human.

Control component 704 may be configured to perform an operation by adjusting operation of vehicle 110B. Control component 704 may include, for example, any circuitry or other hardware, or software that may adjust one or more functions of the vehicle. Some examples include adjustments to change a speed of vehicle 110B, shut off an electric motor that drives one or more wheels, or both.

Figure 8:
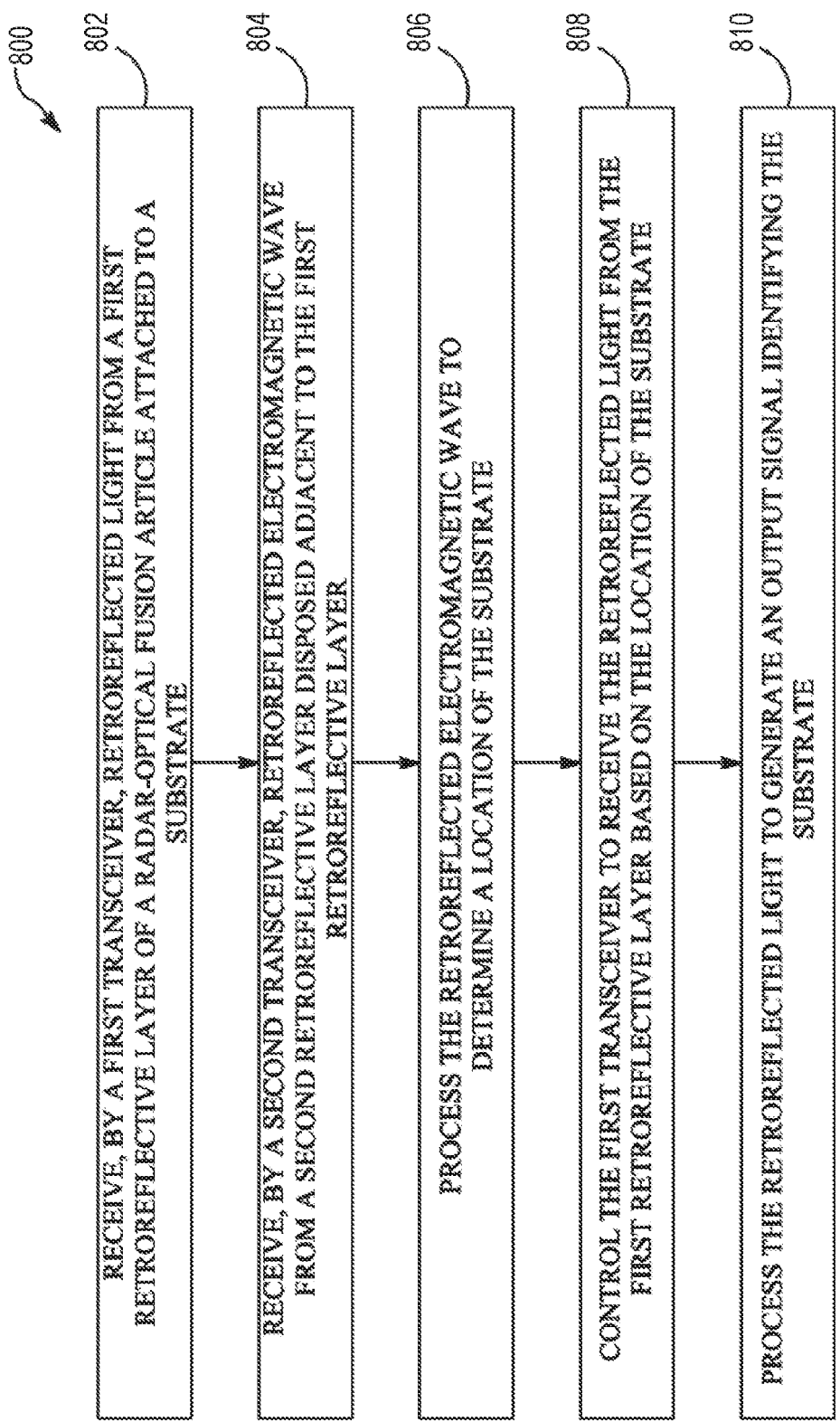
FIG. 8 is a flow diagram illustrating example operation of a computing device for identifying the radar-optical fusion article, in accordance with techniques of this disclosure.

FIG. 8 is a flow diagram 800 illustrating example operation of a monitoring system for identifying a substrate, in accordance with one or more techniques of this disclosure. The techniques are described in terms of monitoring system 116. However, the techniques may be performed by other monitoring systems.

In the example of FIG. 8, monitoring system 116 receives, by first transceiver 602, retroreflected light from first retroreflective layer 302 of radar-optical fusion article 108 attached to substrate 114 (802). The incident light has a wavelength in a range from about 400 nm to about 2500 nm. The first transceiver 602 may be an image capture device or an image sensor, for example, a near-infrared camera.

In some examples, monitoring system 116 receives, by second transceiver 604, retroreflected electromagnetic wave from second retroreflective layer 308 disposed adjacent to the first retroreflective layer 302 (804). The electromagnetic wave has a frequency in a range from about 0.5 GHz to about 100 GHz.

In some examples, monitoring system 116 processes the retroreflected electromagnetic wave to determine a location of substrate 114 (806). The retroreflected electromagnetic wave includes an electromagnetic signature associate with substrate 114. The electromagnetic signature may be at least one of a frequency signature, a polarization signature, a temporal signature, and an angle-dependent signature.

In some examples, monitoring system 116 controls first transceiver 602 to receive the retroreflected light from first retroreflective layer 302 based on the location of substrate 114 (808). For example, monitoring system 116 may steer first transceiver 602 towards a direction of substrate 114. Subsequently, first transceiver 602 may generate an optical image.

In some examples, monitoring system 116 processes the retroreflected light to generate an output signal identifying substrate 114 (810). In one example, monitoring system 116 processes a region of the optical image corresponding to the location of substrate 114. The output signal provides information related to identification of substrate 114. The output signal may provide at least one of a visible indication, an audible indication, and a haptic indication. Monitoring system 116 may provide the output signal to a vehicle or upload the output signal on an internet server.

Figure 9:
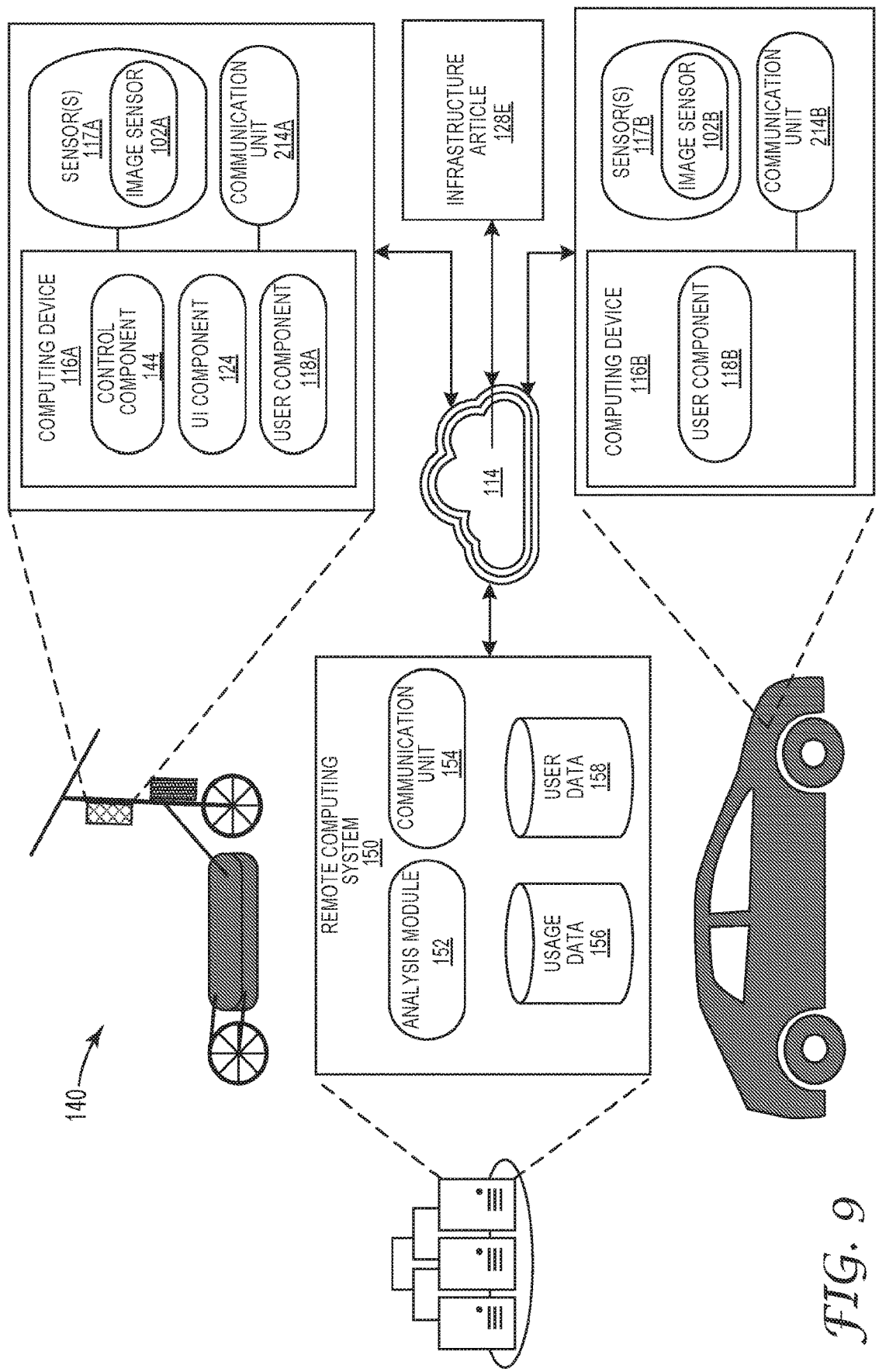
FIGS. 9-11 illustrate systems for implementing techniques and articles of this disclosure.

FIG. 9 is a block diagram illustrating an example system for improving safety associated with an electrically powered scooter, in accordance with techniques of this disclosure. In the examples of FIG. 9, system 150 includes electrically powered scooter 110A, vehicle 104B, and a remote computing system 150. In some examples, the devices shown in FIG. 9 are communicatively coupled to one another via network 114. In some examples, the devices shown in FIG. 9 are communicatively coupled to one another directly, for example, via a DSRC transceiver. The one or more devices of FIG. 9 may implement techniques, articles, and systems of this disclosure.

Electrically powered scooter 110A includes computing device 116A and vehicle 104B include computing device 116B. Computing devices 116A, 116B (collectively, computing devices 116) may each include one or more communication unit 214A, 214B, and sensors 117A, 117B, respectively. Although computing device 116A is shown as attached to electrically powered 110A, in other examples, functionality of computing device 116A may be included in a computing device (e.g., smartphone, smartwatch, wearable, or other portable computing device) that is associated with the operator of electrically powered scooter 100. In such examples, computing device 116A and the computing device that is associated with the operator of electrically powered scooter 100 may communicate with one another and/or one or more other computing devices.

Communication units 214A, 214B (collectively, communication units 214) of computing devices 116 may communicate with external devices by transmitting and/or receiving data. For example, computing device 116 may use communication units 214 to transmit and/or receive radio signals on a radio network such as a cellular radio network or other networks, such as networks 114. In some examples communication units 214 may transmit and receive messages and information to other vehicles, such as information interpreted from infrastructure article 107. In some examples, communication units 214 may transmit and/or receive satellite signals on a satellite network such as a Global Positioning System (GPS) network. In some examples, communications units 214 may transmit and/or receive data through network 114 to remote computing system 150 via communication unit 154.

Sensors 117A, 117B (collectively, sensors 117) may image sensors 102A, 102B (collectively, image sensors 102), temperature sensors, LiDAR, or a combination thereof, to name only a few examples of sensors. Examples of image sensors 102 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In one example, electrically powered scooter 110A or vehicle 104B includes at least two different sensors for detecting light in two different wavelength spectrums. Image sensors 102 may have a fixed field of view or may have an adjustable field of view. An image sensor 102 with an adjustable field of view may be configured to pan left and right, up and down relative to electrically powered scooter 110 or vehicle 104B as well as be able to widen or narrow focus. In some examples, image sensors 102 may include a first lens and a second lens. Electrically powered scooter 110 and/or vehicle 104B may have more or fewer image sensors 102 in various examples.

In the example of FIG. 9, computing device 116A includes an interpretation component 118, a user interface (UI) component 124, and a control component 144. Components 118A, 124, and 144 may perform operations described herein using software, hardware, firmware, or a mixture of both hardware, software, and firmware residing in and executing on computing device 116 and/or at one or more other remote computing devices. In some examples, components 118A, 124, and 144 may be implemented as hardware, software, and/or a combination of hardware and software.

Computing device 116A may execute components 118A, 124, and 144 with one or more processors. Computing device 116A may execute any of components 118A, 124, 144 as or within a virtual machine executing on underlying hardware. Components 118A, 124, 144 may be implemented in various ways. For example, any of components 118A, 124, 144 may be implemented as a downloadable or pre-installed application or "app." In another example, any of components 118A, 124, 144 may be implemented as part of an operating system of computing device 116.

UI component 124 may include any hardware or software for communicating with a user of electrically powered scooter 110. In some examples, UI component 124 includes outputs to a user such as displays, such as a display screen, indicator or other lights, audio devices to generate notifications or other audible functions, and/or haptic feedback devices. UI component 124 may also include inputs such as knobs, switches, keyboards, touch screens or similar types of input devices.

In general, sensors 117 may be used to gather information about infrastructure and roadway conditions proximate to electrically powered scooter 110A and vehicle 104B, such as information about transportation pathways 106. Sensors 117 may generate infrastructure data indicative of the infrastructure proximate to electrically powered scooter 110A or vehicle 104B. Sensors 117 may generate roadway condition data indicative of roadway conditions proximate to electrically powered scooter 110A or vehicle 104B. For example, image sensors 102 may capture images of infrastructure articles, such as lane markings, centerline markings, edge of roadway or shoulder markings, as well as the general shape of the transportation pathway. The general shape of a transportation pathway may include turns, curves, incline, decline, widening, narrowing or other characteristics.

Computing device 116A may include a user component 118A configured to perform techniques of this disclosure. For example, user component 118A may receive, via a remote computing system, data usable by user component 118A to traverse a particular portion of a roadway. In accordance with techniques of this disclosure, the data may be based at least in part on roadway condition data generated by another electrically powered scooter that indicates a roadway condition for the particular portion of the roadway. User component 118A may cause control component 144 to perform, based at least in part on the data usable by the computing device to traverse the particular portion of the roadway, at least one operation. In some examples, the at least one operation may include generating an output or changing an operation of a micromobility device. An output generated by user component 118A may include at least one of visual output, audible output, or haptic output. In some examples, the output may be based on or in response to a roadway condition that the micromobility device is approaching.

Figure 10:
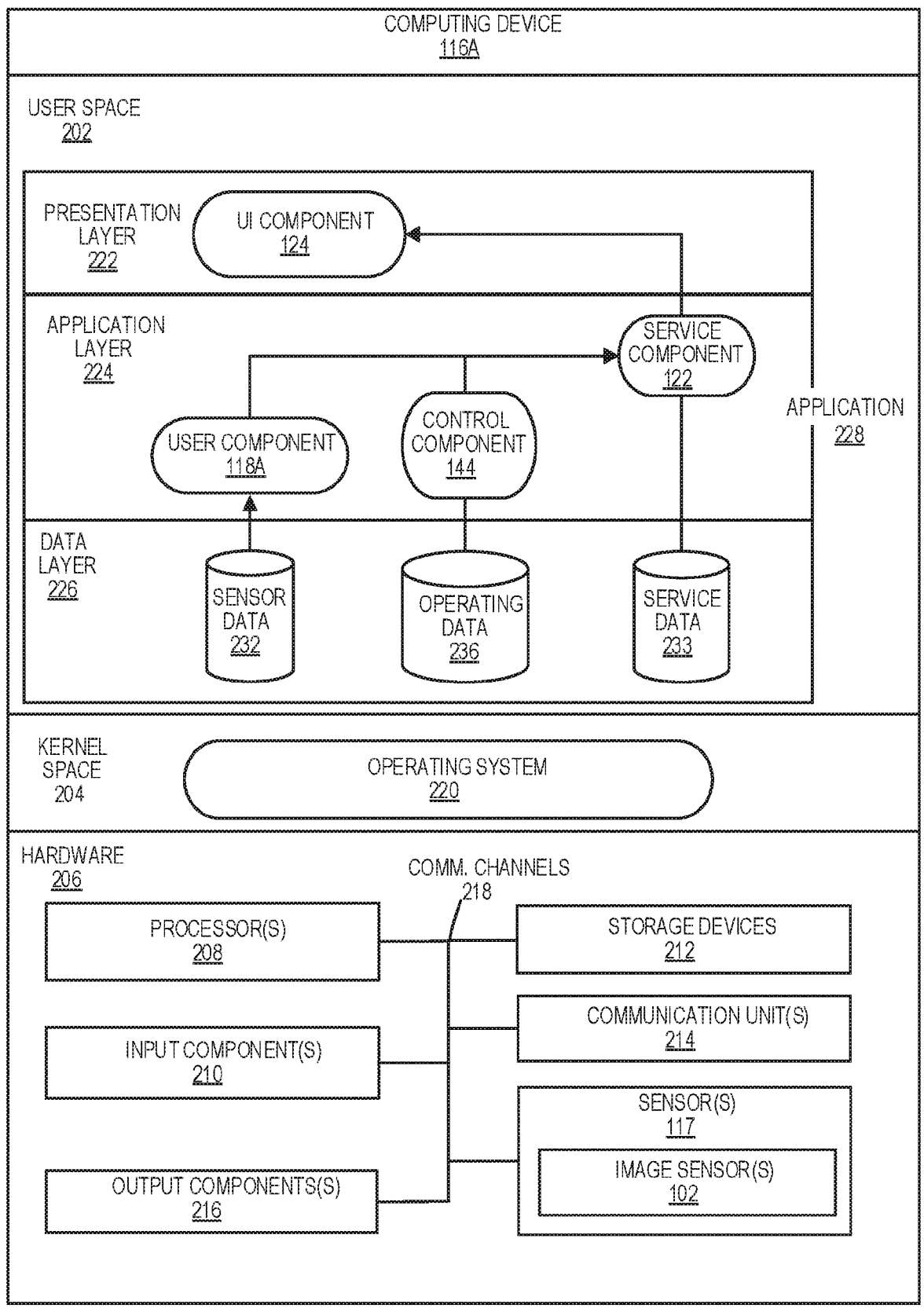

FIG. 10 is a block diagram illustrating an example computing device, in accordance with one or more aspects of the present disclosure. FIG. 10 illustrates only one example of a computing device. Many other examples of computing device 116A may be used in other instances and may include a subset of the components included in example computing device 116A or may include additional components not shown example computing device 116A in FIG. 10. The one or more devices of FIG. 10 may implement techniques, articles, and systems of this disclosure.

As shown in the example of FIG. 10, computing device 116A may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 10, hardware 206 includes one or more processors 208, input components 210, storage devices 212, communication units 214, output components 216, and sensors 117. Processors 208, input components 210, storage devices 212, communication units 214, output components 216, and sensors 1117 may each be interconnected by one or more communication channels 218. Communication channels 218 may interconnect each of the components 208, 210, 212, 214, 216, and 117 and other components for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 116A. For example, processors 208 on computing device 116A may receive and execute instructions stored by storage devices 212 that provide the functionality of components included in kernel space 204 and user space 202. These instructions executed by processors 208 may cause computing device 116A to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 210 of computing device 116A may receive input. Examples of input are tactile, audio, kinetic, and optical input, to name only a few examples. Input components 210 of computing device 116A, in one example, include a voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more communication units 214 of computing device 116A may communicate with external devices by transmitting and/or receiving data. For example, computing device 116A may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a DSRC transceiver, an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

One or more output components 216 of computing device 116A may generate output. Examples of output are tactile, audio, and video output. Output components 216 of computing device 116A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as a liquid crystal display (LCD), a Light-Emitting Diode (LED) or any other type of device for generating tactile, audio, and/or visual output. Output components 216 may be integrated with computing device 116A in some examples.

In other examples, output components 216 may be physically external to and separate from computing device 116A but may be operably coupled to computing device 116A via wired or wireless communication. An output component may be a built-in component of computing device 116A located within and physically connected to the external packaging of computing device 116A (e.g., a screen on a mobile phone). In another example, a presence-sensitive display may be an external component of computing device 116A located outside and physically separated from the packaging of computing device 116A (e.g., a monitor, a projector, etc. that shares a wired and/or wireless data path with a tablet computer).

Output components 216 may also include control component 144, in examples where computing device 116A is onboard an electrically powered scooter. Control component 144 has the same functions as control component 144 described in other examples of this disclosure.

One or more storage devices 212 within computing device 116A may store information for processing during operation of computing device 116A. In some examples, storage device 212 is a temporary memory, meaning that a primary purpose of storage device 212 is not long-term storage. Storage devices 212 on computing device 116A may configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 10, application 228 executes in user space 202 of computing device 116A. Application 228 may be logically divided into presentation layer 222, application layer 224, and data layer 226. Presentation layer 222 may include user interface (UI) component 124, which generates and renders user interfaces of application 228. Application 228 may include, but is not limited to: UI component 124, interpretation component 118A, security component 120, and one or more service components 122. For instance, application layer 224 may interpretation component 118A, service component 122, and security component 120. Presentation layer 222 may include UI component 124.

Data layer 226 may include one or more datastores. A datastore may store data in structure or unstructured form. Example datastores may be any one or more of a relational database management system, online analytical processing database, table, or any other suitable structure for storing data.

Service data 233 may include any data to provide and/or resulting from providing a service of service component 122. For instance, service data 233 may include information about infrastructure articles 107, user information, operating rule sets, or any other information transmitted between one or more components of computing device 116A. Operating data 236 may include instructions for scooter operating rule sets for operating electrically powered scooter 110A.

Sensor data 232 may include infrastructure and/or road condition data, such as image data, signature data, or any other data indicative of infrastructure proximate to electrically powered scooter 110A. For example, communication units 214 may receive, from an image sensor 102, image data indicative of infrastructure and/or road conditions proximate to electrically powered scooter 110A and may store the image data in sensor data 232. Image data may include one or more images that are received from one or more image sensors, such as image sensors 102. In some examples, the images are bitmaps, Joint Photographic Experts Group images (JPEGs), Portable Network Graphics images (PNGs), or any other suitable graphics file formats. In some examples, the image data includes images of one or more road conditions and/or infrastructure articles. In one example, the image data includes images of one or more article message 126 associated with one or more infrastructure articles.

In some examples, user component 118A causes control component 144 to adjust control of electrically powered scooter 110A based on data received from one or more devices such as a remote computing system or infrastructure article. Control component 144 may change the operation of an electrically powered scooter. For example, interpretation component 118A may cause control component 144 to adjust operation of the electric motor and/or adjust operation of the braking assembly (e.g., to adjust a speed of electrically powered scooter 110A). In some examples, user component 118A causes control component 144 to adjust control of electrically powered scooter 110A based on data generated by one or more components or modules in computing device 116A.

Figure 11:
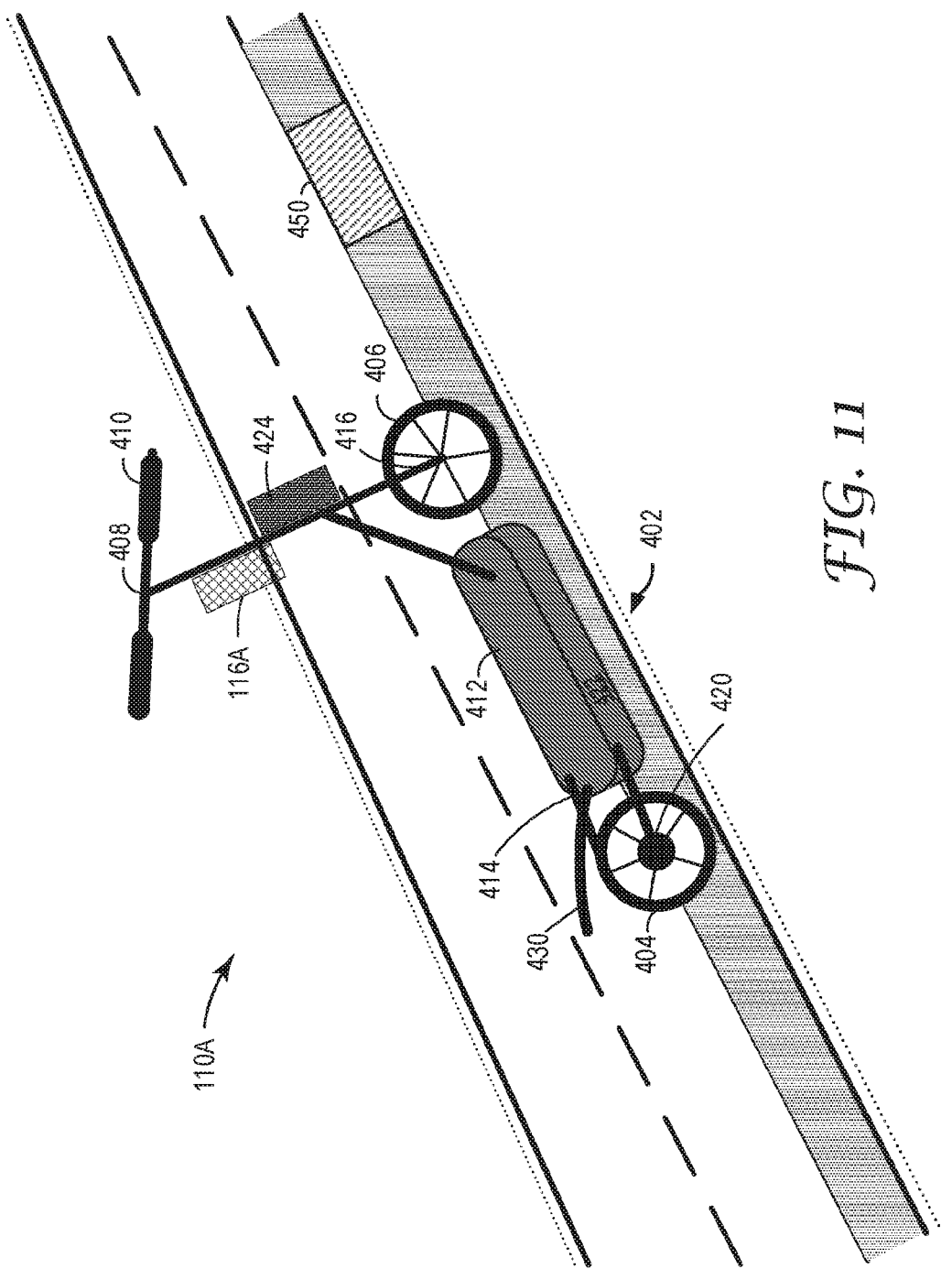

FIG. 11 is a conceptual diagram of an electrically powered scooter 110A, in accordance with techniques of this disclosure. Electrically powered scooter 110A include a chassis 402, a rear wheel 404, a front wheel 406, and a steering assembly 408. Chassis 402 includes chassis support member 412 extending substantially horizontally between a rear-wheel mount 414 at one end of chassis 402 and a front-wheel mount 416 at another end of chassis 402 that is opposite the rear-wheel mount 414. The one or more devices of FIG. 11 may implement techniques, articles, and systems of this disclosure.

In the example of FIG. 11, rear wheel 404 is mounted to rear wheel mount 414 and front wheel 406 is mounted to front wheel mount 416. Front wheel 406 is mounted to front wheel mount 416 for turning steering movement with respect to the front wheel mount 406 and rear wheel 404. Front wheel mount 416 may be coupled to steering assembly 408. Steering assembly 408 may extend generally vertically relative to chassis support member 412. Steering assembly may be angled relative to chassis support member 412. In one example, an angle between chassis support member 412 and steering assembly 408 is between approximately 60 degrees to approximately 90 degrees. Steering assembly 408 may include handlebars 410. Steering assembly 408 may be coupled to front wheel mount 416 such that turning handlebars 410 may cause front wheel 406 to turn.

Electrically powered scooter 110A includes at least one electric motor 420, at least one motor controller 422, and at least one battery 424. Motor controller 422 may be operatively coupled to electric motor 420 to drive rear wheel 404 and/or front wheel 406. In the example of FIG. 11, electric motor 420 is configured to drive rear wheel 404, in some examples, electric motor 420 may be configured to drive front wheel 406. In one example, electrically powered scooter 110A includes a plurality of motors that are each configured to drive a respective wheel.

Electrically powered scooter 110A may include a braking apparatus 430. In the example of FIG. 11, braking apparatus 430 is operatively coupled to rear wheel 404 to selectively slow and/or stop rear wheel 404. In some examples, electrically powered scooter 110A includes a braking apparatus coupled to front wheel 406.

In accordance with techniques of this disclosure, computing device 116A may receive data usable by an electrically powered scooter to traverse a particular portion of a roadway. The data may be based at least in part on roadway condition data generated by a different electrically powered scooter that indicates a roadway condition for the particular portion of the roadway. Computing device 116A may cause electrically powered scooter 110A to perform, based at least in part on the data to traverse the particular portion of the roadway, at least one operation. Example operations may include generating an output, sending a message, and/or changing an operation of the electrically powered scooter. In some examples, computing device 116A may send, to a remote computing system, roadway condition data for a particular portion of the roadway, wherein the roadway condition data indicates a roadway condition for the particular portion of the roadway and is generated based at least in part on one or more sensors communicatively coupled to the computing device.

In some examples, techniques and systems of this disclosure may provide for detection and propagation of road conditions using inertial data (accelerometer, gyroscope and magnetometer data) collected by micro-mobiles coupled with their respective GPS coordinates. Road conditions may, in some examples, refer to defects of the road network such as potholes, pavement cracking, hard turns that require attention, etc. As part of techniques and systems of this disclosure, a computing device may receive the aforementioned data from the micro-mobile probes at its input and generate a micro-mobile-centric infrastructure quality map or structure data that could be represented on a map. Using historic and/or real-time data harvested by the micro-mobile probes (e.g., sensors), an information network is established that provides alerts to micro-mobiles about areas where increased attention is needed and areas to avoid. Furthermore, this technique presents an incentive mechanism according to which routes passing through areas for which small amounts of information is available are incentivized so that more micro-mobiles drive them.

In some examples, micromobility devices collect and emit information (e.g., in real-time) about the quality of their trajectory which can be stored at a remote computing system, such as a server or the cloud platform, along with relevant historic data. The remote computing system may receive this information and process it in order to generate an infrastructure quality map (or structured data representation of the map) which uses or illustrates the harvested probe trajectory data. The infrastructure quality map or structured data representation may be processed to identify locations associated with smoother (e.g., less complex or less risky) trajectories as well as areas where the pavement has degraded to a certain level of discomfort for the micro-mobile operator.

In some examples, a communication network may be established amongst micromobility devices as well as remote locations. The communicate network may propagate the infrastructure quality data in the form of warnings and recommendations such that micromobility operators and/or computing devices that process the data can make more informed decisions about potential routes. An external connection to this network can also be established with authorities responsible for restoring the quality of areas that have been identified as exhibiting high degradation of the quality of the pavement.

In some examples, techniques of this disclosure may provide incentives that allows for the prioritization of routes passing through areas for which existing data are not available at a sufficient granularity. Such information and techniques may also be implemented in computing devices accessed by entities responsible for measuring the effectiveness of scheduled maintenance procedures by incentivizing the operators of the micromobility devices to route through recently maintained or constructed areas.

In some examples, a computing device may determine which areas of infrastructure are high quality or lower risk to the operation of micro-mobiles and then to change or incentivize the operation of the micro-mobile to a lower risk infrastructure layout or high infrastructure quality area. A computing device may collect infrastructure and layout information that is relevant to micromobility operation. A computing device that uses that information to determine infrastructure quality and layout factors and to determine how to change or influence the state or operation of micro-mobility devices through an environment. A computing device may collect information related to the infrastructure quality and layout as it relates to the operation of a micro-mobility device could inform riders or route applications of routes to take that may be safer due to higher quality infrastructure and layout. A computing device may inform riders operating in lower quality infrastructure of areas and objects to avoid (blind corners, potholes, raised pavement) as they operate through the environment.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, eEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Radar-optical fusion article 108, in accordance with techniques of this disclosure, provides conspicuity to substrate 114 to which article 108 is attached. The information received from article 108 may be used by vehicles 110, infrastructure articles 104, other micro-mobility devices 106, or pedestrians 112 to be more aware of their surroundings and avoid collisions. In some instances, article 108 enables faster characterization of substrate 114 as monitoring system 116 controls first transceiver 602 to process only a particular region within the field of view of first transceiver 602. Further, monitoring system 116 enables edge computing and may result in power saving.

Various examples have been described. These and other examples are within the scope of the following claims.

The invention claimed is:

1. A radar-optical fusion article for attachment to a substrate, the radar-optical fusion article comprising:
    a first retroreflective layer configured to retroreflect at least a portion of light having a wavelength in a range from about 400 nm to about 2500 nm; and
    a second retroreflective layer disposed adjacent to the first retroreflective layer, the second retroreflective layer configured to retroreflect at least a portion of an electromagnetic wave having a frequency in a range from about 0.5 GHz to about 100 GHz.

2. The radar-optical fusion article of claim 1, wherein the retroreflected light from the first retroreflective layer has a wavelength in a range from about 700 nm to about 2500 nm.

3. The radar-optical fusion article of claim 1, wherein the retroreflected electromagnetic wave from the second retroreflective layer has a frequency in the range from about 75 GHz to about 81 GHz.

4. The radar-optical fusion article of claim 1, wherein the retroreflected light from the first retroreflective layer comprises a light signature associated with the substrate.

5. The radar-optical fusion article of claim 4, wherein the light signature is based on at least one of a spatial pattern, a wavelength-selective signature, an angle-dependent signature and a polarization-specific signature.

6. The radar-optical fusion article of claim 4, wherein the light signature is indicative of at least one of a location of the substrate, a type of the substrate, and an environment of the substrate.

7. The radar-optical fusion article of claim 1, wherein the retroreflected electromagnetic wave from the second retroreflective layer comprises a radar signature associated with the substrate.

8. The radar-optical fusion article of claim 7, wherein the radar signature is at least one of a frequency signature, a polarization signature, a temporal signature and an angle-dependent signature.

9. The radar-optical fusion article of claim 1, wherein the substrate is a physical surface of a vehicle, an infrastructure article, a micro-mobility device, a building, a human, a clothing article, or a wearable article.

10. The radar-optical fusion article of claim 1 further comprising a filter layer disposed between the first retroreflective layer and the second retroreflective layer, the filter layer comprising a plurality of elements configured to provide a filtered signal including an electromagnetic signature associated with the substrate.

11. The radar-optical fusion article of claim 10, wherein the electromagnetic signature is at least one of a frequency signature, a polarization signature, a temporal signature, and an angle-dependent signature.

12. The radar-optical fusion article of claim 10, wherein each of the plurality of elements of the filter layer is in the shape of a ring, a square, a dipole, a crossed dipole, a tripole, or a Jerusalem cross.

13. A micro-mobility device comprising:
a chassis having a rear wheel mount at one end and a front wheel mount at the other end with a chassis support member extending therebetween;
a chassis-supported rear wheel mounted to the rear wheel mount;
a chassis-supported front wheel mounted to the front wheel mount for turning steering movement with respect to the front wheel mount and the chassis-supported rear wheel;
a chassis-supported motor physically coupled to the chassis and configured by a motor controller to drive at least one of the chassis-supported front wheel or the chassis-supported rear-wheel for powered movement over a ground surface; and
a radar-optical fusion article attached to at least a portion of the micro-mobility device, the radar-optical fusion article comprising:
a first retroreflective layer configured to retroreflect at least a portion of light having a wavelength in a range from about 400 nm to about 2500 nm; and
a second retroreflective layer disposed adjacent to the first retroreflective layer, the second retroreflective layer configured to retroreflect at least a portion of an electromagnetic wave having a frequency in a range from about 0.5 GHz to about 100 GHz.

14. The micro-mobility device of claim 13, wherein the retroreflected light from the first retroreflective layer has a wavelength in a range from about 700 nm to about 2500 nm.

15. The micro-mobility device of claim 13, wherein the retroreflected electromagnetic wave from the second retroreflective layer has a frequency in a range from about 75 GHz to about 81 GHz.

16. The micro-mobility device of claim 13 further comprising a steering assembly coupled to the chassis-supported front wheel, wherein the radar-optical fusion article is attached to the steering assembly.

17. The micro-mobility device of claim 13, wherein the retroreflected light from the first retroreflective layer comprises a light signature associated with the micro-mobility device.

18. The micro-mobility device of claim 17, wherein the light signature is based on at least one of a spatial pattern, a wavelength-selective signature, an angle-dependent signature, and a polarization-specific signature.

19. The micro-mobility device of claim 17, wherein the light signature is indicative of a location of the micro-mobility device.

20. The micro-mobility device of claim 13 further comprising a filter layer disposed between the first retroreflective layer and the second retroreflective layer, the filter layer comprising a plurality of elements configured to provide a filtered signal including an electromagnetic signature associated with the substrate.

21. The micro-mobility device of claim 20, wherein the electromagnetic signature is at least one of a frequency signature, a polarization signature, a temporal signature, and an angle-dependent signature.

* * * * *